US011561288B2

(12) United States Patent
Kawakami

(10) Patent No.: US 11,561,288 B2
(45) Date of Patent: Jan. 24, 2023

(54) OPTICAL APPARATUS, ON-BOARD SYSTEM, AND MOVEMENT APPARATUS

(71) Applicant: CANON KABUSHIKI KAISHA, Tokyo (JP)

(72) Inventor: Tomoaki Kawakami, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 405 days.

(21) Appl. No.: 16/844,349

(22) Filed: Apr. 9, 2020

(65) Prior Publication Data

US 2020/0333446 A1 Oct. 22, 2020

(30) Foreign Application Priority Data

Apr. 18, 2019 (JP) ............................ JP2019-079293
Mar. 24, 2020 (JP) ............................ JP2020-052363

(51) Int. Cl.
*G01S 7/481* (2006.01)
*G01S 17/931* (2020.01)
(Continued)

(52) U.S. Cl.
CPC ............ *G01S 7/4817* (2013.01); *B60Q 9/008* (2013.01); *G01S 17/931* (2020.01); *G02B 5/22* (2013.01);
(Continued)

(58) Field of Classification Search
CPC ..... G01S 7/4817; G01S 17/931; B60Q 9/008; G02B 5/22; G02B 6/00; G02B 6/0086;
(Continued)

(56) References Cited

U.S. PATENT DOCUMENTS 9,846,236 B2 12/2017 Imai
2013/0182239 A1 7/2013 Kaiser
(Continued)

FOREIGN PATENT DOCUMENTS

CN 108603758 A 9/2018
CN 108828611 A 11/2018
(Continued)

OTHER PUBLICATIONS

Office Action issued in Chinese Appln. No. 202010288417.8 dated Apr. 29, 2022. English translation provided.

*Primary Examiner* — Peter D Nolan
*Assistant Examiner* — Kenneth M Dunne
(74) *Attorney, Agent, or Firm* — Rossi, Kimms & McDowell LLP

(57) ABSTRACT

An optical apparatus includes a deflector configured to deflect illumination light from a light source to scan an object, and configured to deflect reflected light from the object, a light guide configured to guide the illumination light form the light source to the deflector, and configured to guide the reflected light from the deflector to a light receiving element, an optical member having a reflective area that makes first light which is part of the illumination light from the deflector incident on the deflector by reflection, and a controller configured to obtain information regarding the deflector on the basis of information of the first light from the reflective area. In a cross-section including the optical path from the reflective area to the light guide, a width of the reflective area is smaller than a width of the illumination light on the reflective area.

20 Claims, 18 Drawing Sheets

(51) Int. Cl.

| | |
|---|---|
| ***B60Q 9/00*** | (2006.01) |
| ***G02B 5/22*** | (2006.01) |
| ***G02B 6/00*** | (2006.01) |
| ***G02B 26/10*** | (2006.01) |
| ***F21V 8/00*** | (2006.01) |
| *B60W 30/09* | (2012.01) |

(52) U.S. Cl.
CPC ............. *G02B 6/00* (2013.01); *G02B 6/0086* (2013.01); *G02B 26/105* (2013.01); *B60W 30/09* (2013.01); *B60W 2420/52* (2013.01); *G02B 2006/0098* (2013.01)

(58) Field of Classification Search
CPC ......... G02B 26/105; G02B 2006/0098; B60W 30/09; B60W 2420/52
See application file for complete search history.

(56) References Cited

U.S. PATENT DOCUMENTS

| | | | | |
|---|---|---|---|---|
| 2017/0153319 | A1 | 6/2017 | Villeneuve et al. | |
| 2018/0284237 | A1* | 10/2018 | Campbell | G01S 17/931 |
| 2018/0292532 | A1 | 10/2018 | Meyers et al. | |
| 2019/0101644 | A1* | 4/2019 | DeMersseman | G01S 17/931 |
| 2019/0113622 | A1* | 4/2019 | Wu | G01S 17/42 |
| 2020/0271823 | A1* | 8/2020 | Herman | G01V 8/20 |
| 2021/0003511 | A1* | 1/2021 | Bergam | G01S 7/4814 |
| 2021/0011128 | A1 | 1/2021 | Shi et al. | |

FOREIGN PATENT DOCUMENTS

| | | | | |
|---|---|---|---|---|
| CN | 109001753 | A | 12/2018 | |
| CN | 109188451 | A | 1/2019 | |
| DE | 102019101966 | A1 * | 7/2020 | G01S 17/42 |
| JP | 2009288559 | A | 12/2009 | |
| JP | 4476599 | B2 | 6/2010 | |
| JP | 2012068350 | A | 4/2012 | |
| JP | 2016048211 | A | 4/2016 | |
| JP | 6347079 | B2 | 6/2018 | |
| KR | 1020180058068 | A | 5/2018 | |
| WO | WO-2018197246 | A1 * | 11/2018 | |

* cited by examiner

OPTICAL APPARATUS, ON-BOARD SYSTEM, AND MOVEMENT APPARATUS

BACKGROUND OF THE INVENTION

Field of the Invention

The present invention relates to an optical apparatus, an on-board system, and a movement apparatus that receiving reflected light from an illuminated object to detect the object.

Description of the Related Art

As a method of measuring a distance to an object, LiDAR (Light Detection and Ranging) that calculates the distance to the object using a time until reflected light is received from the illuminated object and a phase of the detected reflected light has been known. Japanese Patent No. ("JP")4476599 discloses a configuration that measures a position of the object and the distance to the object on the basis of a position of a deflector (driving mirror) when a light receiving element received the reflected light from the object.

However, due to variations in machining accuracy during production of the driving mirror, individual differences in an optical inclined angle (deflection angle) of light flux from the driving mirror and a resonance frequency of the driving mirror may occur. Also, the deflection angle and the resonance frequency change due to environmental changes such as temperature and atmospheric pressure. If the deflection angle and the resonance frequency are different from the design values, it becomes difficult to accurately measure the distance to the object.

SUMMARY OF THE INVENTION

The present invention provides an optical apparatus, an on-board system, and a movement apparatus that can easily obtain information regarding a deflector.

An optical apparatus according to one aspect of the present invention a deflector configured to deflect illumination light from a light source to scan an object, and configured to deflect reflected light from the object, a light guide configured to guide the illumination light form the light source to the deflector, and configured to guide the reflected light from the deflector to a light receiving element, an optical member having a reflective area that makes first light which is part of the illumination light from the deflector incident on the deflector by reflection, and a controller configured to obtain information regarding the deflector on the basis of information of the first light from the reflective area. In a cross-section including the optical path from the reflective area to the light guide, a width of the reflective area is smaller than a width of the illumination light on the reflective area.

Further features of the present invention will become apparent from the following description of exemplary embodiments with reference to the attached drawings.

DESCRIPTION OF THE EMBODIMENTS

Figure 1:
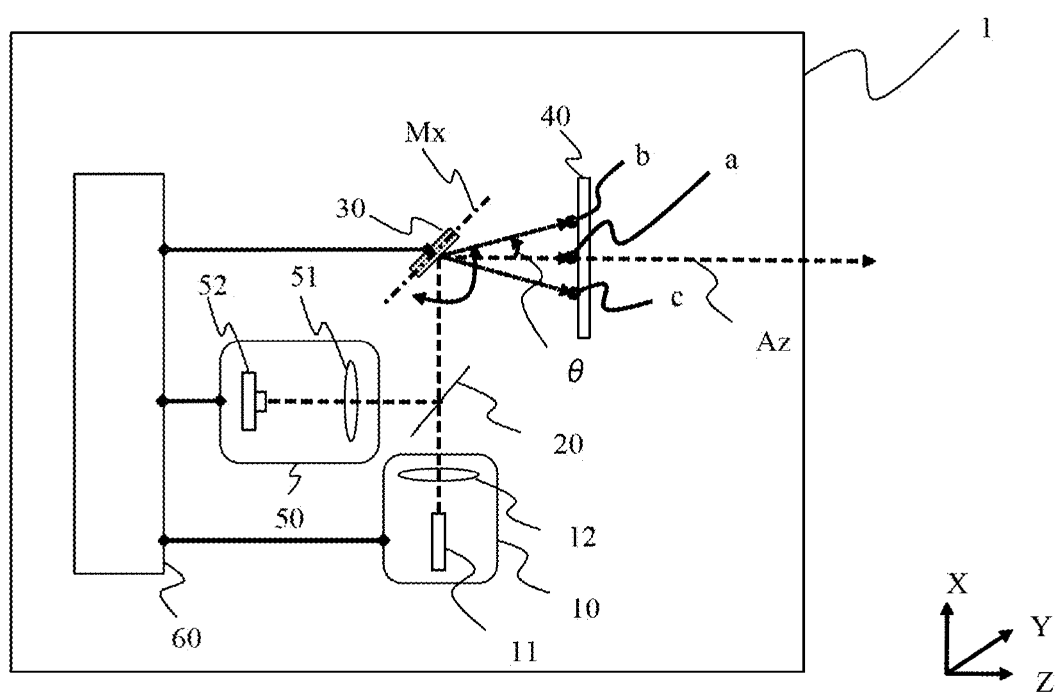
FIG. 1 is a schematic diagram of an optical apparatus according to a first embodiment.

Exemplary embodiments of the invention will be described below with reference to the accompanied drawings. In each of the drawings, the same elements will be denoted by the same reference numerals and the duplicate descriptions thereof will be omitted.

An optical apparatus using the LiDAR includes an illumination system that illuminates an object and a light receiving system that receives reflected light and scattering light from the object. In LiDAR, there are a coaxial system in which part of optical axes of the illumination system and the light receiving system coincide with each other, and a non-coaxial system in which each optical axis does not coincide with each other. The optical apparatus according to the present embodiment is suitable for the coaxial LiDAR.

First Embodiment

FIG. 1 is a schematic diagram of an optical apparatus 1 according to this embodiment. The optical apparatus 1 includes a light source unit 10, an optical path separator (light guide) 20, a driving mirror (deflector) 30, a cover glass 40, a detector 50, and a controller 60. The light source unit 10 includes a light source 11 and a collimator 12 that converts divergent light from the light source 11 into substantially parallel light. As the light source 11, a semiconductor laser having a high energy concentration and a high directivity can be used. When the optical apparatus 1 is applied to an in-vehicle system (an on-board system) as described later, a human may be included in an object. Thus, it is desirable to employ a light source that emits infrared light having little effect on human eyes. A wavelength of an illumination light emitted by the light source 11 according to this embodiment is 905 nm included in a near infrared region. The wavelength of the illumination light may be a wavelength such as 945 nm or 1550 nm.

The optical path separator 20 is composed of, for example, a perforated mirror or a beam splitter, separates an illumination optical path and a light receiving optical path, guides the illumination light from the light source unit 10 to the driving mirror 30, and guides reflected light (including scattering light) from the driving mirror 30 to the detector 50.

The driving mirror 30 is a MEMS mirror and rotates around the Y axis or the Mx axis perpendicular to the Y axis indicated by a dashed line. In this embodiment, as the driving mirror 30, the MEMS mirror is used, but various driving mirrors such as a swing mirror such as a galvanometer mirror or a rotating mirror such as a polygon mirror may be used. The driving mirror 30 deflects the illumination light from the optical path separator 20 to scan the object, and guides the reflected light from the object to the optical path separator 20 by deflection. The cover glass 40 is an opening for receiving the reflected light from the object while passing the illumination light from the driving mirror 30, and blocks dust and the like from the outside.

The detector 50 includes an imaging lens 51, a light receiving element 52, and a bandpass filter (not illustrated). The reflected light from the object passes through the driving mirror 30 and the optical path separator 20 and is received by the light receiving element 52. The controller 60 drives the light source 11 and the driving mirror 30 at predetermined drive voltages and drive frequencies (deflection frequency, resonance frequency), respectively. Additionally, the controller 60 controls the deflection of the driving mirror 30 on the basis of the output from the light receiving element 52 (information regarding reference light (first light) that is part of the illumination light from the driving mirror 30). In this embodiment, the controller 60 controls at least one of a vibration angle (optical inclined angle, deflection angle) of the illumination light from the driving mirror 30 and the resonance frequency of the driving mirror 30. The swing angle corresponds to a swing angle or a rotation angle of the driving mirror 30 (is twice of the swing angle or the rotation angle).

Figure 2A:
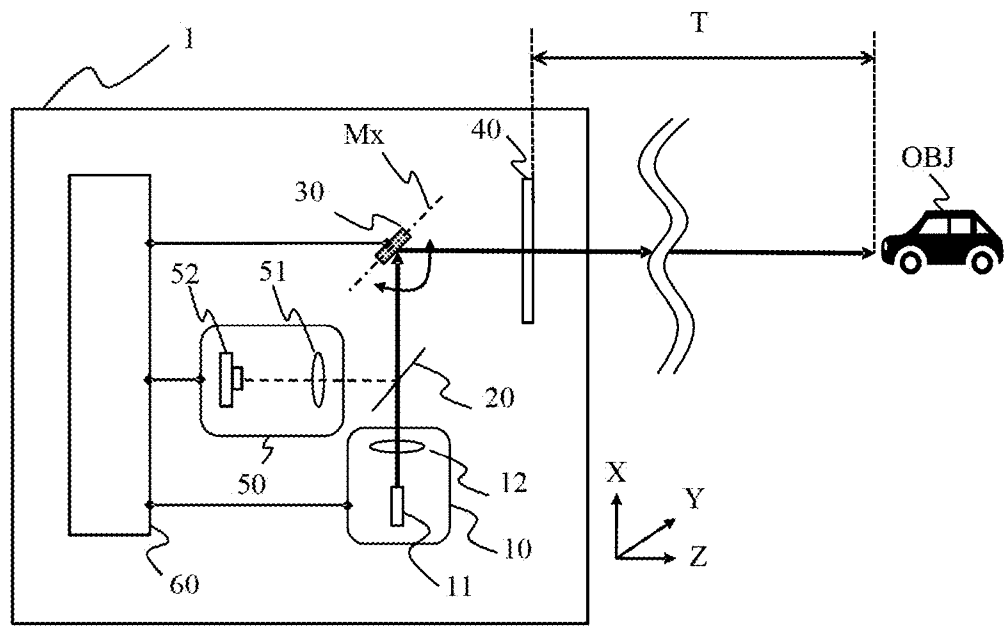
FIGS. 2A and 2B are explanatory diagrams of an illumination optical path and a light receiving optical path.
Figure 2B:
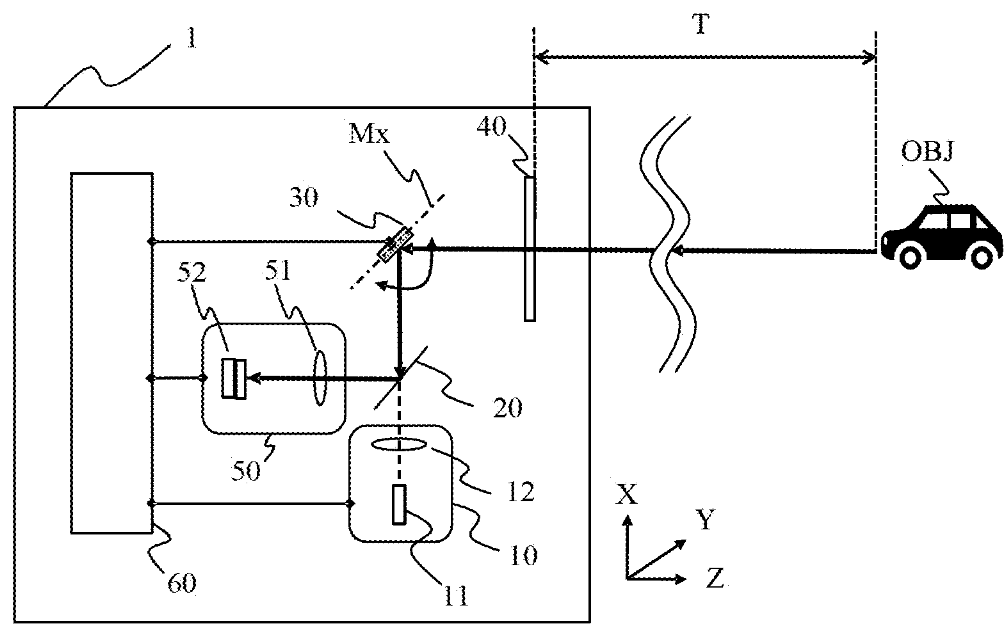

FIGS. 2A and 2B are explanatory diagrams of the illumination optical path and the light receiving optical path. FIG. 2A illustrates that the illumination light from the light source unit 10 is reflected by the driving mirror 30, passes through the cover glass 40, and illuminates the object OBJ away from the optical apparatus 1 by a distance T. FIG. 2B illustrates that the reflected light from the object OBJ passes through the cover glass 40, is reflected by the driving mirror 30, is reflected by the optical path separator 20, and is condensed on the detector 50.

The driving mirror 30, for example, drives by ±α° around the Mx axis at the resonance frequency $\omega_{Mx}$[Hz], and by ±β° around the Y axis at the resonance frequency $\omega_y$[Hz]. In this embodiment, as illustrated in FIG. 1, when the optical axis Az coincides with a central field angle of an area (scanning area) in which the driving mirror 30 can be driven, regular reflected light or back scattering light returns to the light receiving element 52 from a generation source (reference part) of stray light indicated by the point a of the cover glass 40. The regular reflected light or the back scattering light is considered as fixed stray light. The generation source of the stray light may be a member, for example a mark such as paint, a concave part such as a scratch, and a convex part such as a protrusion, that reflects the reference light, which is used for controlling the deflection of the driving mirror 30, other than the effective light for illuminating the object.

When the driving mirror 30 reciprocates around the Y axis in one cycle in the state that the optical axis Az is a center and t is time, the optical inclined angle θ the driving mirror 30 is represented by the following expression (1).

$$\theta=\alpha\times\sin(2\pi\times\omega_y\times t) \quad (1)$$

Here, when the optical inclined angle θ is smaller than the ratio k with respect to the maximum deflection angle β, the stray light S is represented by the following expression (2).

$$S=\begin{cases}|\cos(\pi/2\times\theta/k\beta)| & (\theta<|k\beta|)\\ 0 & (\theta\geq|k\beta|)\end{cases} \quad (2)$$

Figure 3:
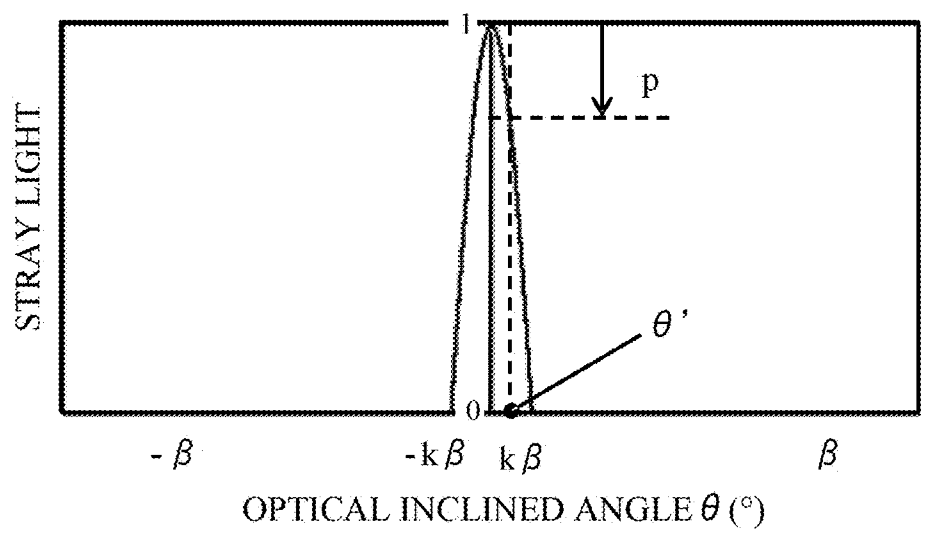
FIG. 3 is a diagram showing a relationship between an optical inclined angle and stray light.

FIG. 3 is a diagram showing a relationship between the optical inclined angle θ and the stray light S. The abscissa axis is the optical inclined angle θ, and the ordinate axis is a value obtained by standardizing the stray light S. Here, when the resonance frequency around the Y axis changes from $\omega_y$ to $\omega_{y'}$ in the state that the light emission timing is constant, the optical inclined angle θ shifts from 0, in which the optical path of the central field angle is accord with the optical axis Az to maximize the stray light, by the shift angle θ' at a predetermined time. The shaft angle θ' is represented by the following expression (3).

$$\theta'=\beta\times\sin(2\pi\times\omega_y'/\omega_y) \quad (3)$$

In this case, the intensity of the stray light S obtained by the light receiving element 52 decreases by the intensity p. The intensity p is represented by the following expression (4).

$$p=1-\cos(\pi/2\times\theta'/k\beta) \quad (4)$$

Figure 4:
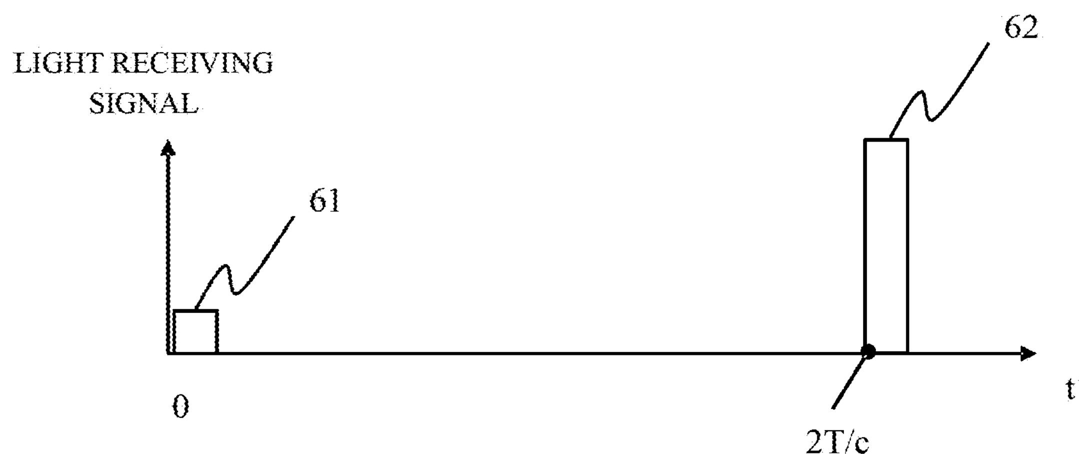
FIG. 4 is a diagram showing a relationship between a signal of a reflected light signal from an object and a signal of fixed stray light.

FIG. 4 is a diagram showing a relationship between the signal of the reflected light from the object OBJ and the signal of the fixed stray light S from the cover glass 40, which are obtained by the light receiving element 52. The abscissa axis is the elapsed time t from the light emission of the light source 11, and the ordinate axis is the light receiving signal obtained by the light receiving element 52.

The light receiving signal 61 is a signal of the fixed stray light S corresponding to the optical inclined angle θ, and is detected immediately after the light source 11 emits light. The light receiving signal 62 is a signal of the reflected light from the object OBJ depending on the distance to the object OBJ and the quantity of the reflected light from the object OBJ, and is detected after passing a time 2 T/c (c: speed of light) after the light source 11 emits light. The light receiving signal 61 is temporally separated from the light receiving signal 62. Additionally, the light reception signal 61 is detected according to the optical inclined angle θ, but is detected within a predetermined time after the light source 11 emits light regardless of the presence or absence of the object OBJ.

The above configuration will be described using specific numerical values. It is assumed that the driving mirror 30 swings ±20° at 1.2 kHz around the Y axis and ±7.5° at 60 Hz around the Mx axis. When emitting light at 144 kHz, the light source 11 emits light by 120 pulses while the driving mirror 30 moves around the optical axis Az in one cycle.

Figure 5:
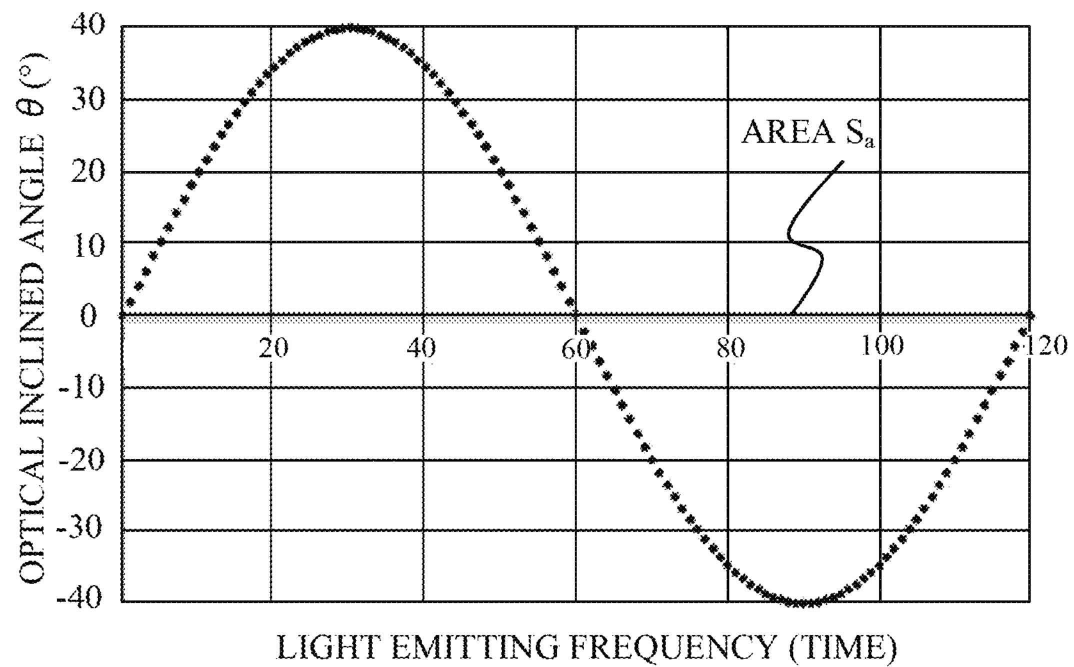
FIG. 5 is a diagram showing a relationship between a light emission timing of a light source and the optical inclined angle in one cycle of driving of a driving mirror according to the first embodiment.

FIG. 5 is a diagram showing a relationship between the light emission timing of the light source 11 and the optical inclined angle θ in one cycle of the driving of the driving mirror 30. In FIG. 5, the stray light occurs in a range of 2% indicated by the area Sa in the range of the optical inclined angle θ (±40°). When the frequency of the Y axis changes from 1.2 kHz to 1.201 kHz, the changes in the deviation angle θ' and the resonance frequency are calculated as 0.21° and 8.3%, respectively, according to the expressions (3) and (4). That is, the controller 60 can estimate the optical inclined angle θ and the change in the resonance frequency using the expressions (3) and (4), and can control the swing angle θ and the resonance frequency using the estimated result.

As described above, generating the stray light based on part of the illumination light from the driving mirror 30 on the emission side than the driving mirror 30 can calculate the optical inclined angle θ and the resonance frequency of the driving mirror 30. As a result, even when the environment changes, the direction of the driving mirror 30 can be calculated or corrected, so that the position of the object OBJ can be accurately and stably measured. Further, since the optical inclined angle θ and the resonance frequency of the driving mirror 30 are detected from the LiDAR function without providing a special mechanism, the optical apparatus 1 can be simplified and reduced in cost.

In this embodiment, the rotation direction around the Y axis having a fast resonance frequency is described as an example, but the case that the rotation direction is a direction around the Mx axis having a slow resonance frequency, and the driving in that direction follows a function different from the function expressed by the expression (1) can be applied to the present invention.

In this embodiment, the generation source of the stray light is provided on the cover glass 40 having no refractive power, but the present invention is not limited to this. For example, an optical system may be provided on the emission side than the driving mirror 30, and the generation source may be provided in the optical element (optical member) itself included in the optical system. Specifically, at least one region having a different transmittance (or reflectance) may be provided in a region through which the illumination light from the driving mirror 30 is transmitted in the optical element. Further, a coating boundary surface may be provided at an end of the optical element immediately after the driving mirror 30 so that the stray light occurs. Additionally, a mechanical light shielding member may be arranged according to the position of the generation source of the stray light.

Second Embodiment

Figure 6:
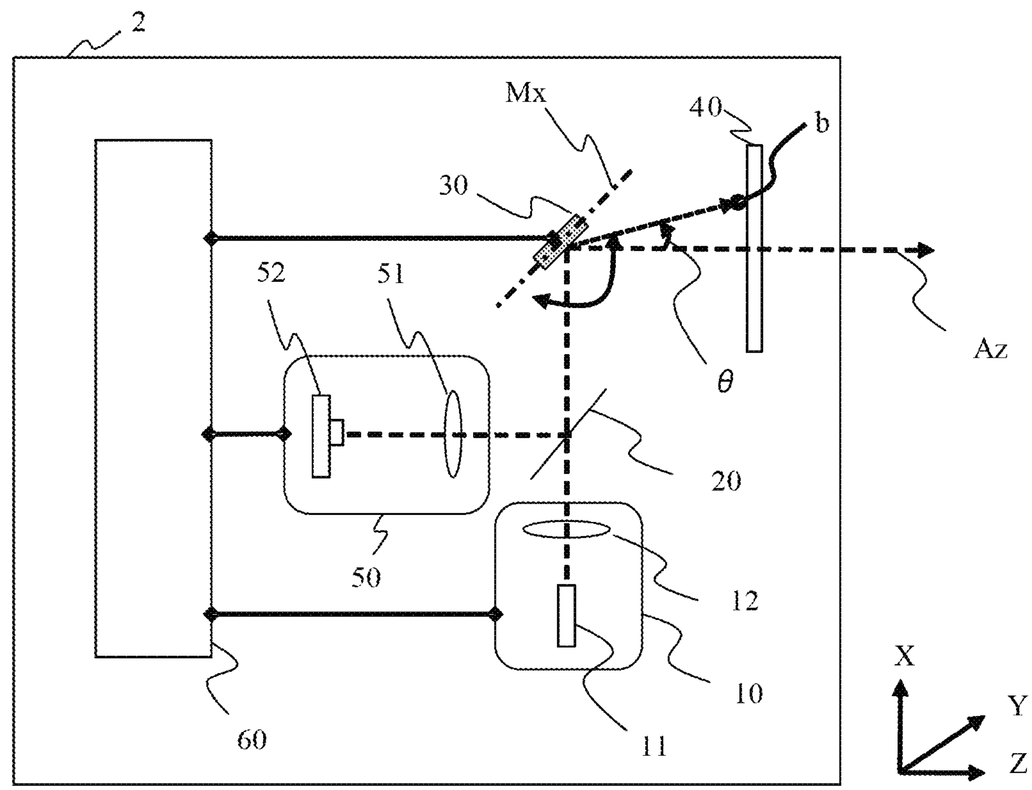
FIG. 6 is a schematic diagram of an optical apparatus according to a second embodiment.

FIG. 6 is a schematic diagram of the optical apparatus 2 of the present embodiment. The basic configuration of the optical apparatus 2 is the same as that of the optical apparatus 1. In this embodiment, points different from the configuration of the first embodiment will be described, and description of the same configuration as the first embodiment will be omitted. In this embodiment, the light receiving element 52 receives the stray light generated at the point b of the cover glass 40.

Figure 7:
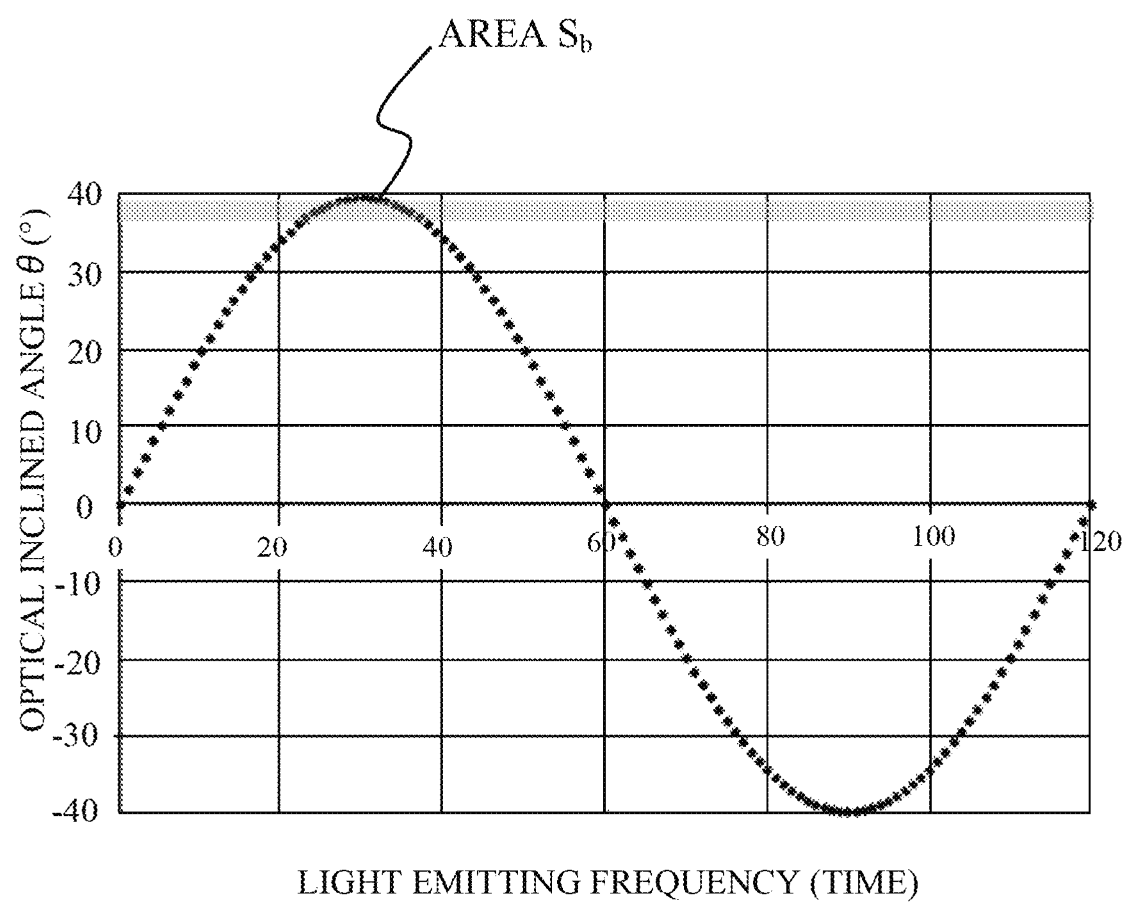
FIG. 7 is a diagram showing a relationship between a light emission timing of a light source and an optical inclined angle in one cycle of driving of a driving mirror according to the second embodiment.

FIG. 7 is a diagram showing a relationship between the light emission timing of the light source 11 and the optical inclined angle θ in one cycle of the driving of the driving mirror 30. In this embodiment, the stray light occurs in the range illustrated by the area $S_b$.

Figure 8:
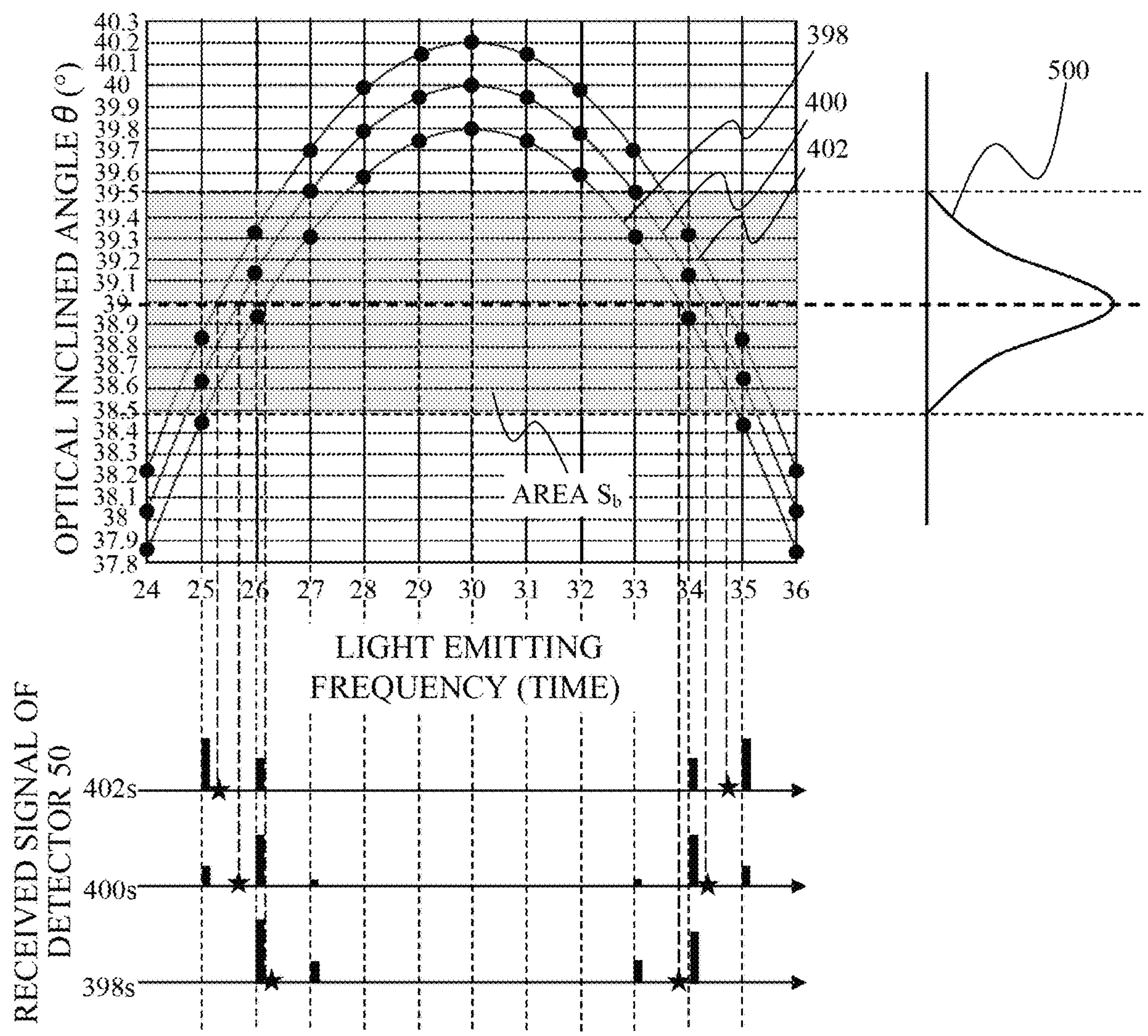
FIG. 8 is an enlarged view of an area $S_b$ in FIG. 7.

FIG. 8 is an enlarged view of the area $S_b$. FIG. 8 illustrates shows the relationship between the optical inclined angle θ and the light emission timing when the optical inclined angle θ and the resonance frequency of the driving mirror 30 and the light emission frequency of the light source 11 is the same as in the first embodiment.

In FIG. 8, the stray light occurs in a range of ±0.5% as a center of a value inside by 2.5% than the maximum value of the optical inclined angle θ. That is, the stray light occurs in the optical inclined angle θ, which is larger than −39.5° and is smaller than −38.5°, and the optical inclined angle θ, which is larger than 38.5° and is smaller than 39.5°.

When the driving mirror 30 is not changed, the detector 50 detects the stray light by 6 pulses on the curve 400 in the area $S_b$. Between the timing at which the first 3 pulses of the stray light are observed and the timing at which the subsequent 3 pulses of the stray light are observed, there is a timing corresponding to 5 pulses at which no stray light is observed. The optical inclined angle θ is 40.2° or 39.8° when changing from 40° by 0.5%. When the optical inclined angle θ is 40.2°, the detector 50 detects the stray light by 4 pulses on the curve 402 in the area $S_b$. Between the timing at which the first 2 pulses of the stray light are observed and the timing at which the subsequent 2 pulses of the stray light are observed, there is a timing corresponding to 7 pulses at which no stray light is observed. Meanwhile, when the optical inclined angle θ is 39.8°, the detector 50 detects the stray light by 4 pulses on the curve 398 in the area $S_b$. Between the timing at which the first 2 pulses of the stray light are observed and the timing at which the subsequent 2 pulses of the stray light are observed, there is a timing corresponding to 5 pulses at which no stray light is observed. In this embodiment, the optical inclined angle θ can be estimated using the number of the observed stray light and the number of the timing at which the stray light is not observed during the time in which the stray light is observed.

In the range where the stray light is observed, the intensity of the stray light often actually changes according to the optical inclined angle θ. This is because light from the light source also has a distribution gradient, and the stray light becomes large when a portion where the illuminance of the emitted light is high hits the area where the stray light occurs. The curve 500 represents the intensity of the stray light detected by the detector 50. The stray light is the strongest when the optical inclined angle θ is 39°, weakens as the optical inclined angle θ is separated from 39° and is not detected when the optical inclined angle θ is 38.5° or 39.5°. The stray light, which is detected by the detector 50 and is detected for each light receiving timing in consideration of strength of the stray light corresponding to the optical inclined angle θ, is shown as **398*s*, 400*s*, and 402*s***.

For example, as shown in **400*s*, the optical inclined angle (39° in FIG. 8) when the stray light becomes the strongest can be detected with high accuracy on the basis of the timing when the stray light is detected, the intensity of the stray light, and the intensity of the stray light assumed by the curve 500**.

The timing at which the optical inclined angle θ when the stray light becomes strongest can be detected is twice within the range shown in FIG. 8. In each of **398*s*, 400*s*, and 402*s*, the timing at which the stray light is assumed to be the strongest is indicated by an asterisk, but the swing angle θ of the driving mirror 30** can be assumed from an interval of two timings.

As described above, detecting the stray light generated on the basis of part of the illumination light from the driving mirror 30 on the emission side than the driving mirror 30 using the function of LiDAR can detect the optical inclined angle θ. As a result, even when the environment changes, the optical inclined angle θ can be calculated, so that the position of the object OBJ can be accurately measured.

In this embodiment, the rotation direction around the Y axis having a fast resonance frequency is described as an example, but the rotation direction is a direction around the Mx axis having a slow resonance frequency can be applied to the present invention.

Third Embodiment

Figure 9:
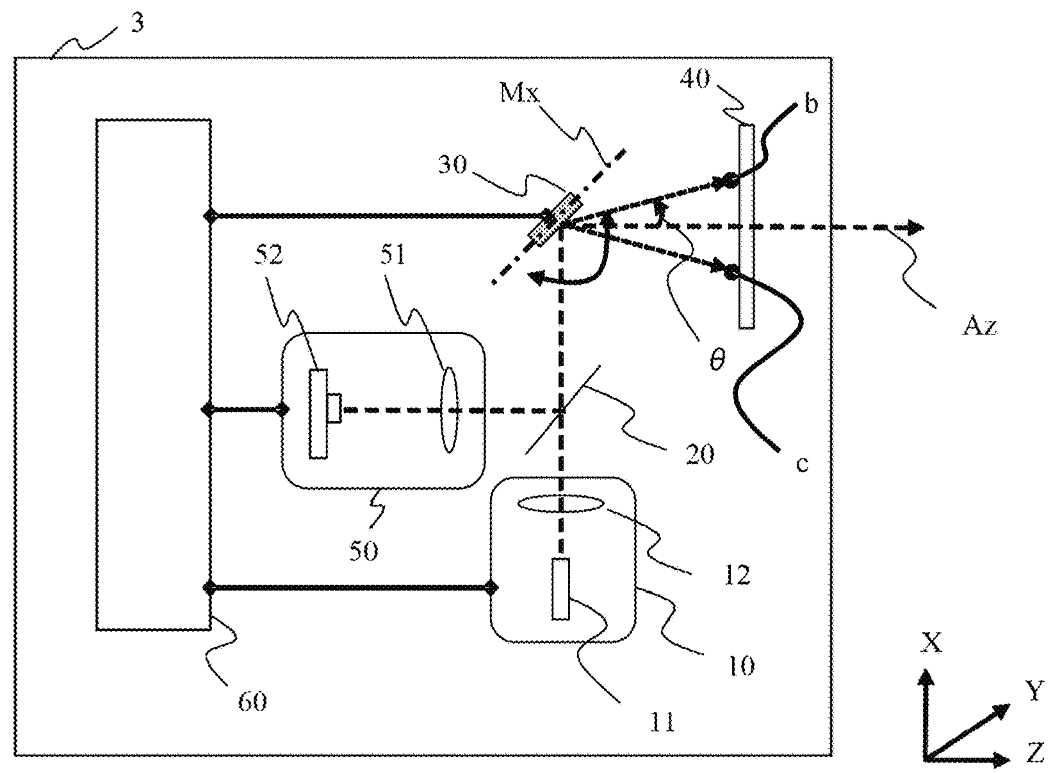
FIG. 9 is a schematic diagram of an optical apparatus according to a third embodiment.

FIG. 9 is a schematic diagram of an optical apparatus 3 according to this embodiment. The basic configuration of the optical apparatus 3 is the same as that of the optical apparatus 1. In this embodiment, points different from the configuration of the first embodiment will be described, and description of the same configuration as the first embodiment will be omitted. In this embodiment, the light receiving element 52 receives the stray light generated at the points b, c symmetrical with respect to the optical axis A, of the cover glass 40.

Figure 10:
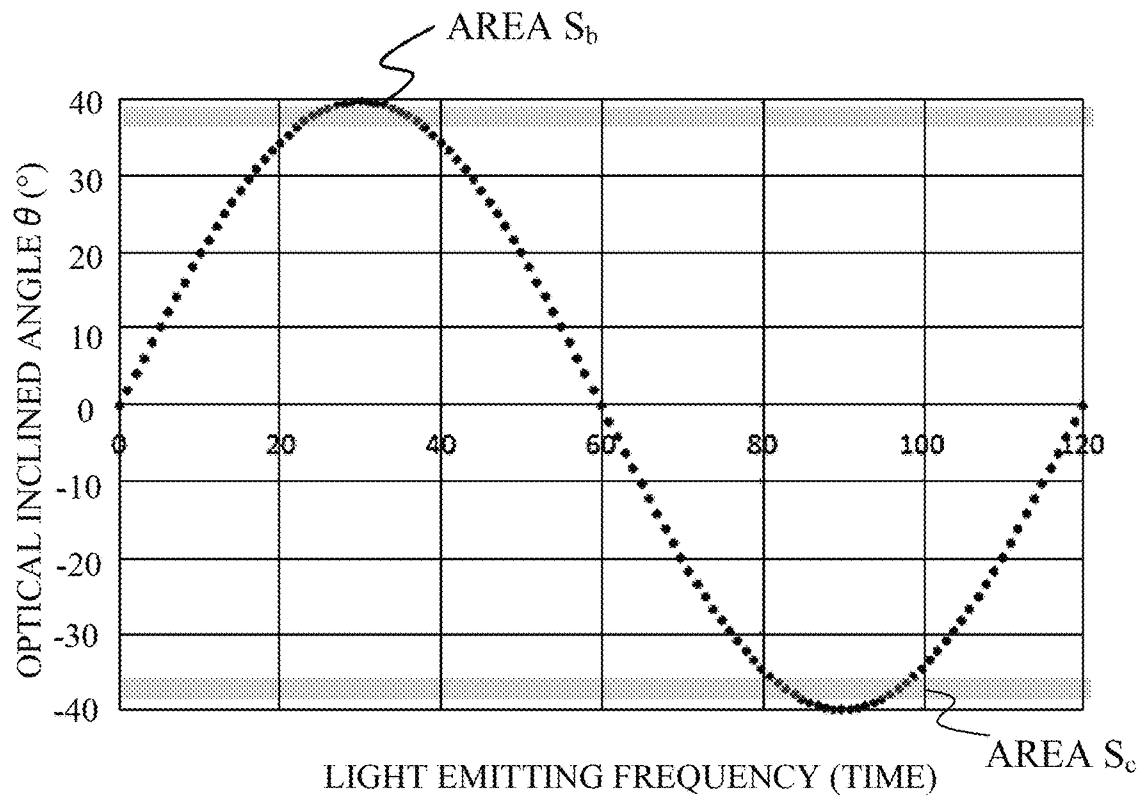
FIG. 10 is a diagram showing a relationship between a light emission timing of a light source and an optical inclined angle in one cycle of driving of a driving mirror according to a third embodiment.

FIG. 10 is a diagram showing a relationship between the light emission timing of the light source 11 and the optical inclined angle θ in one cycle of the driving of the driving mirror 30. In this embodiment, the stray light occurs in the range indicated as areas $S_b$ and $S_c$.

Figure 11A:
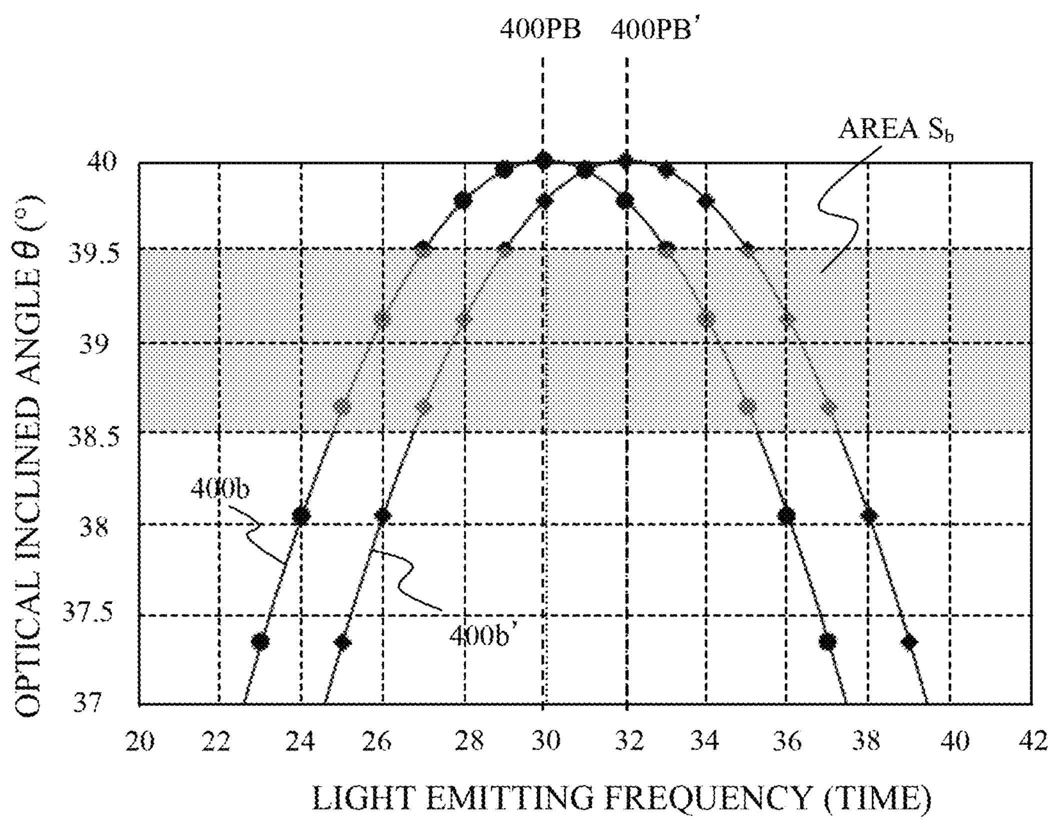
FIGS. 11A and 11B are enlarged view of areas $S_b$ and Sc in FIG. 10.
Figure 11B:
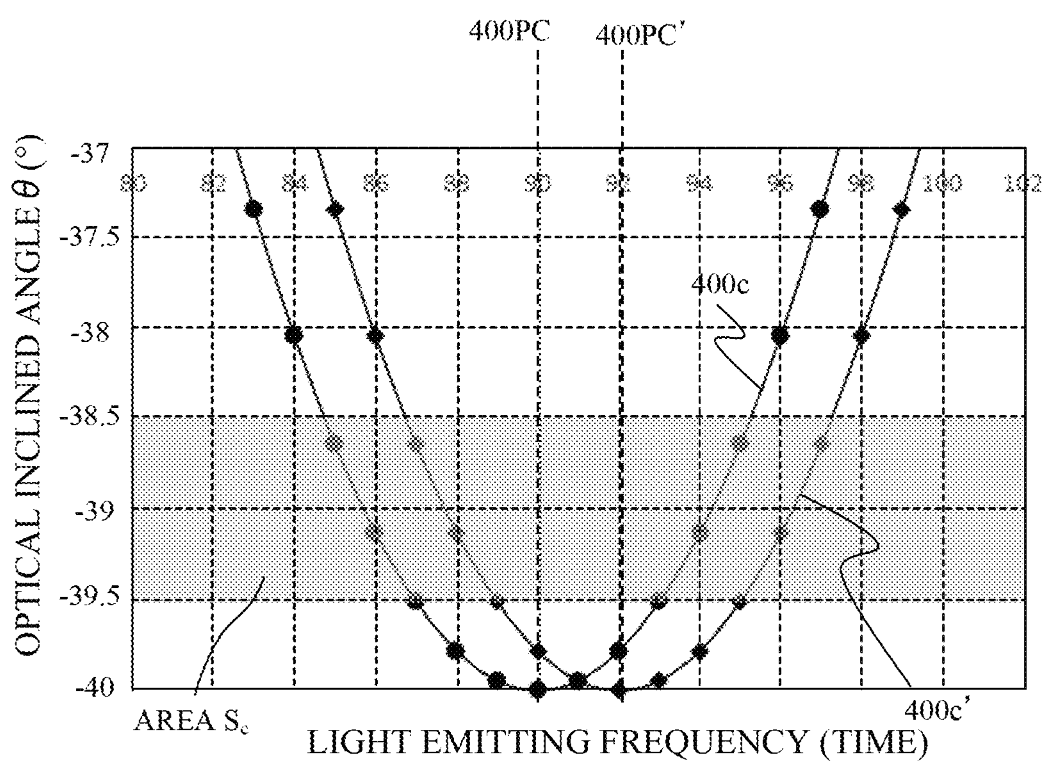

FIGS. 11A and 11B are enlarged view of areas $S_b$ and Sc in FIG. 10, respectively. The detector 50 detects the stray light during the 25th to 35th light emissions as shown by the curve **400*b*. 400PB represents the timing at which the optical inclined angle θ becomes maximum. In addition, the detector 50 detects the stray light during the 85th to 95th light emissions as indicated by the curve 400*c*. 400PC represents the timing at which the optical inclined angle θ becomes maximum. In each of FIGS. 11A and 11**B, the timing at which the optical inclined angle θ is maximum, as described in the second embodiment, can be detected from the measured value of the stray light.

If the light emission timing of the light source 11 is shifted by 2 pulses, the timing of emitting the stray light also changes by 2 pulses. In that case, the detector 50 detects the stray light during the 27th to 37th light emissions as indicated by the curve **400*b*'. 400PB' represents the timing at which the optical inclined angle θ becomes maximum. In addition, the detector 50 detects the stray light between the 87th and 97th light emissions as indicated by the curve 400*c*'. 400PC' represents the timing at which the optical inclined angle θ becomes the maximum. That is, the timing of light emission of the light source 11** or light reception with respect to the optical inclined angle θ is totally shifted from timing of the two stray lights.

In the case where the light emitting timing of the light source 11 is shifted by a value smaller than 1 pulse, the timing at which the optical inclined angle θ is maximized is approximated from the light receiving timing and the quantity of the received stray light, and shift quantities of the timings in the region where the two stray lights occur can be calculated. Thus, the phase shift between the driving mirror 30 and the light emission timing or the light receiving timing of the light source 11 can be found.

As described above, generating a plurality of stray lights base on part of the illumination light from the driving mirror 30 on the emission side than the driving mirror 30 can detect the phase shift of the driving mirror 30 to the light emission timing or the light receiving timing. As a result, the driving of the driving mirror 30 and the light receiving timing or the light emitting timing of the light source 11 can be corrected on the basis of the phase shift. Further, correcting the direction of the driving mirror 30 on the software can measure the position of the object OBJ with high accuracy while accurately recognizing the direction of the driving mirror 30.

Forth Embodiment

Figure 12:
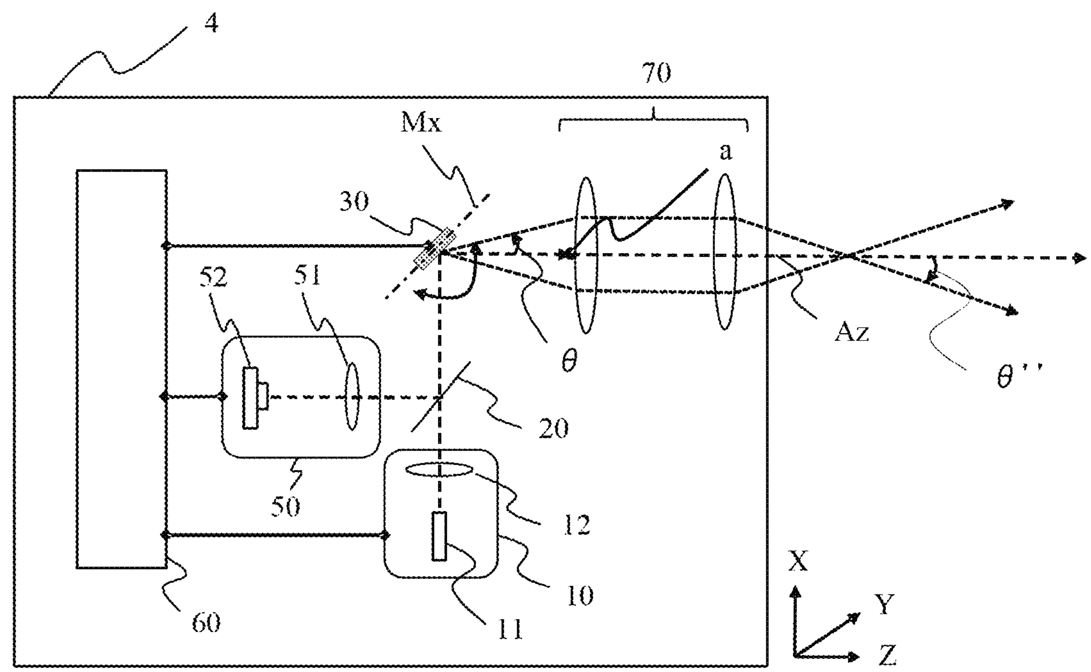
FIG. 12 is a schematic diagram of an optical apparatus according to a fourth embodiment.

FIG. 12 is a schematic diagram of an optical apparatus 4 according to this embodiment. The optical apparatus 4 has a variable power optical system 70 that is arranged behind the driving mirror 30 to change the optical inclined angle θ. The variable power optical system 70 enlarges the diameter of the illumination light from the driving mirror 30 and reduces the diameter of the reflected light from the object OBJ. In this embodiment, there is a case where the emitted light reflected by the driving mirror 30 and part of the optical element face each other, and the reflected light from the optical element may be detected by the detector 50.

Figure 13:
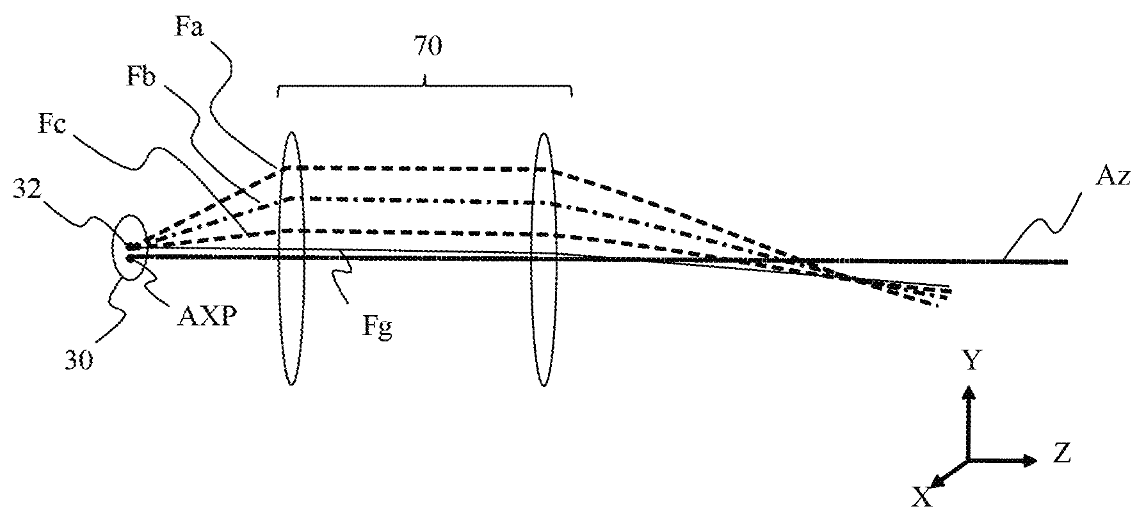
FIG. 13 is a diagram illustrating an optical path on a Y-Z plane after being reflected by a driving mirror according to the fourth embodiment.

However, since it is generally desirable that there is no stray light within the field angle, it is desirable that stray light does not occur within the field angle and stray light occurs outside the filed angle. For example, as shown in FIG. 13, in the variable power optical system 70, the optical axis may be decentered from the center of the driving mirror 30. FIG. 13 is a diagram illustrating an optical path on a Y-Z plane after being reflected by the driving mirror 30. Fa, Fb, and Fc respectively represent the illumination optical path of the most off-axis field angle, the illumination optical path in the case that the optical inclined angle is 0 (central field angle of the scanning field angle), and the illumination optical path of the opposite most off-axis field angle when the driving mirror 30 swings to the Mx axis. The illumination optical path Fc is the illumination optical path of the most off-axis field angle to be used in measuring the distance to the object OBJ, and is not the illumination optical path when the driving mirror 30 swings maximally. In the range in which the driving mirror 30 is inclined and reflects, the illumination optical paths Fa, Fb, and Fc use only one side with respect to the optical axis of the variable magnification optical system 70, and the stray light does not occur.

Additionally, Fg represents the illumination optical path when the driving mirror 30 maximally swings with respect to the Mx axis. When the illumination optical path Fg is perpendicularly incident on the optical element of the variable power optical system 70, a small reflected light from the optical element is reflected by the optical path separator 20 after passing the same optical path as the illumination optical path Fg and is detected as the stray light by the detector 50. The field angle between the illumination optical path Fc and the illumination optical path Fg is a margin for the filed angle where the stray light does not occur. For example, a deviation due to a manufacturing error is provided as the margin.

In FIG. 13, the intersection point AXP of the optical axis of the variable power optical system 70 and the driving mirror 30 deviates from the center 32 of the driving mirror 30, and in other words, the variable power optical system 70 is eccentric to the driving mirror 30. Making the variable power optical system 70 eccentric to the driving mirror 30 (arranging the driving mirror 30 so that the optical path of the principal ray of the illumination light at the central field angle in the scanning field angle range of the driving mirror 30 do not coincide with the optical axis of the variable power optical system 70) can make the stray light from the illumination optical path Fg eccentric. Thereby, since the area in which the stray light does not occur be increased to the field angle further outside the illumination optical path Fg, the range on the side of the illumination optical path Fg further than the illumination optical path Fc can be used to measure the distance to the object OBJ. Also, if the illumination optical path Fb is distributed to the side of the illumination optical path Fg, the illumination optical path Fa can be shifted to the side of the optical axis center of the variable magnification optical system 70, so that the effective diameter of the variable magnification optical system 70 is reduced and the entire optical apparatus 4 can be reduced in size. Thus, on the driving mirror 30, the center 32 of the driving mirror 30 is desirable not to coincide with the optical axis of the variable power optical system 70.

As described above, the optical system can be designed so as to provide an area where the stray light is generated slightly outside the used field angle. Since it is out of the use field angle, it may be designed so that the stray light is emitted over a wide range. For example, in the first embodiment, the stray light occurs within the range of 2% of the optical inclined angle θ around the position where the optical inclined angle θ is 0, but may occur in the range of 25%. Thereby, the stray light can be detected at a plurality of timings.

Figure 14:
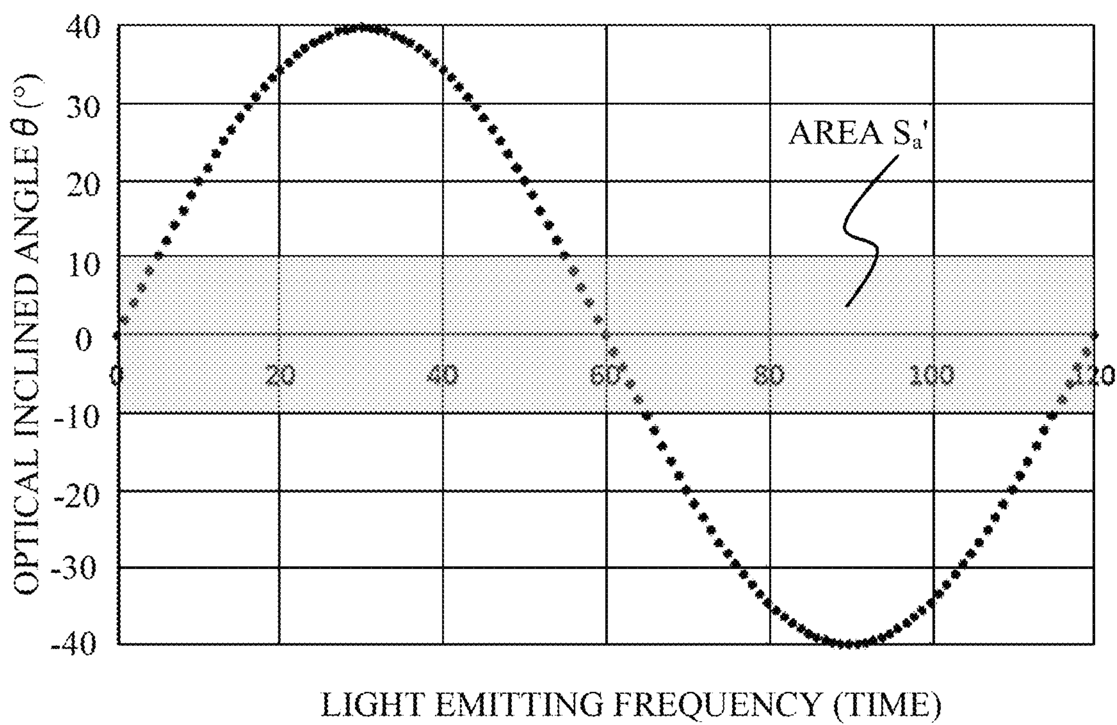
FIG. 14 is a diagram showing a relationship between a light emission timing of a light source and an optical inclined angle in one cycle of driving of a driving mirror according to the fourth embodiment.
Figure 15:
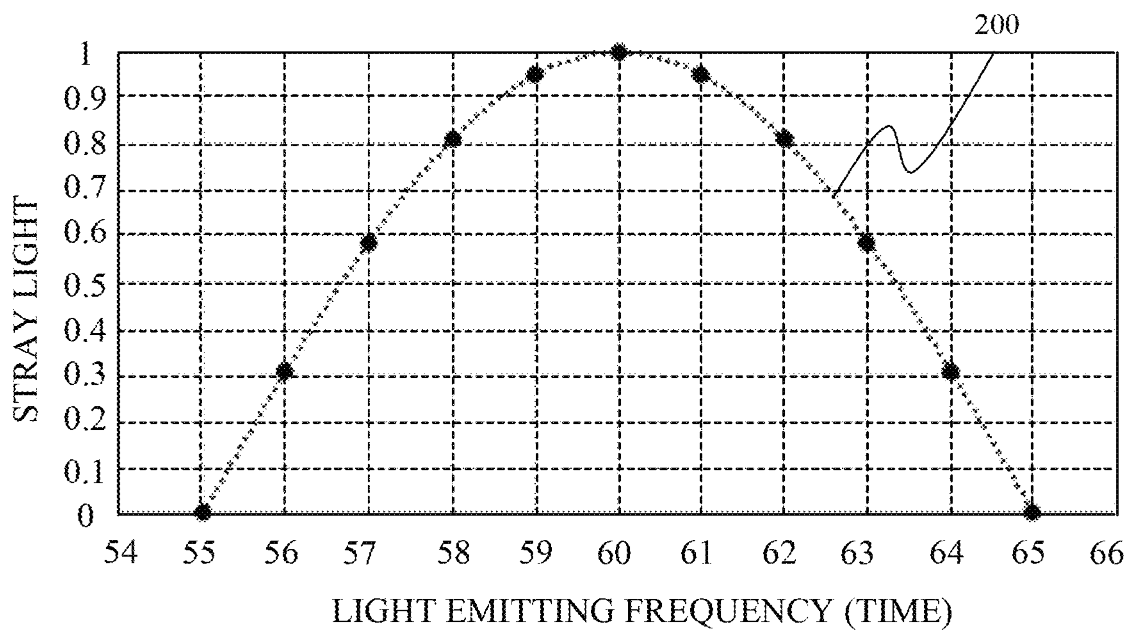
FIG. 15 is a diagram showing a relationship between a light emission timing and a signal of stray light in a vicinity of an area $S_a'$ in FIG. 14.

FIG. 14 is a diagram showing a relationship between the light emission timing of the light source and the optical inclined angle θ in one cycle of the driving of the driving mirror 30. FIG. 15 is a diagram showing a relationship between the light emission timing (light receiving timing) and the signal of the received stray light in a vicinity of the area $S_a$' in FIG. 14. From the approximation represented by the line 200, the maximum value of the stray light can be counted backward. The maximum value of the stray light is measured at regular intervals, and if a change is observed, it is considered that the light source output (light emission intensity) had changed. If the controller 60 corrects the light source output so as to return to the original state, the illumination output from the optical apparatus 4 can also be corrected. Thereby, the danger that the lighting output is inadvertently increased and adversely affects the human eye can be eliminated, and the deterioration of the performance of measuring the distance to the distant object OBJ due to the reduced lighting output can be suppressed.

As described above, arranging the variable magnification optical system 70 on the emission side than the driving mirror 30 so as to generate the stray light at the non-use field angle while preventing the regular reflection within the use angle of view can detect the quantity of exposure from the stray light outside the use field angle and control it. Further, since the light emission timing and output of the light source 11 can also be detected, a mechanism for detecting them can be eliminated, and the position of the object OBJ can be accurately, stably and safely measured.

In this embodiment, the position where the optical inclined angle θ is 0 is shown as the center, but if the stray light is measured at a plurality of timings and a specific quantity of the stray light can be calculated from the measured value, conditions to detect the stray light may be other.

In the above embodiments, the time interval of emission of the light source is the same, but in view of the deflection angle of the scanning mirror, the scanning interval may be equal when illuminated from the scanning mirror.

In other words, if the quantity of the stray light at the timing when the stray light is detected is analyzed from the above viewpoint, the light emission timing or the change in the deflection angle of the scanning mirror can be detected.

As described above, according to the configuration of this embodiment, the deflection of the driving mirror 30, which is the deflector, can be favorably controlled. Further, the light emission of the light source unit 10 can be well controlled.

The optical apparatus according to this embodiment can be applied to an automatic machine or a sensor for automatic driving because it can measure a distance to a distant object as described below.

Fifth Embodiment

In Japanese Patent No. 6347079, an optical axes of a illumination system and a light receiving system accord at a beam splitter. In this configuration, the illumination system includes a light source, a collimating lens, and a driving mirror (for example, a MEMS (Micro Electro Mechanical Systems) mirror), and illuminates a wide area by driving the driving mirror.

In the light receiving system, reflected/scattering light from an object is reflected on the side of the light source after being received by the driving mirror, is partially deflected by the beam splitter on the way to the light source, and is received by a light receiving element. In this configuration, while illuminating the inside of the driving range of the mirror, if there is the object in the range, the distance from the position of the driving mirror to the position of the object is measured when the reflected light from the object is received.

In addition, the direction of the object is obtained by placing a reflector on part of the emission side than the driving mirror and using the timing of receiving reflected light from the reflector. The coaxial optical system in which the direction of illumination and the direction of light reception are the same is easy to suppress unnecessary external light while taking in the reflected light from the object as much as possible, and thus is superior regarding a remote ranging. In the case of the remote ranging, it is desired to capture a large quantity of the reflected light from the object, and thus it is desirable to increase the quantity of the illumination light as much as possible while taking safety of human eyes into consideration. However, when the light receiving element with high sensitivity is used to capture a large quantity of light from a distance, the light from the reflector is too strong and the light receiving element saturates. As a result, ranging performance and direction detection accuracy of the object worsen and possibility of breakdown heightens. For example, when detecting an object from as far as 100 meters away, the reflected light from the object is about eight digits lower than the quantity of the illumination light. That is, if the illumination is 1 W, the reflected light from the object is about 10 nW. On the other hand, in the case of a configuration in which the reference reflected light from the reflector for measuring the direction of the object can be detected by 0.01%, if the illumination is W, the reference reflected light is 100 μW, which is much larger than the quantity of the reflected light from the object.

In applications where the outside air temperature changes greatly, such as automatic driving, since the apparatus is affected by the temperature change, the swing angle of the driving mirror, the light source output, and various signal timings in signal processing change. That is, when a deviation occurs in the direction detection of the object, the positional deviation quantity becomes large, particularly in a remote ranging. Thus, forming the reference reflected light having an appreciate light quantity is very important to accurately measure the direction of the object and the distance to the object. An object of this embodiment is to form the reference light having the appropriate light quantity to accurately measure the direction of the object and the distance to the object even in the remote ranging.

Hereinafter, an embodiment of the optical apparatus of this embodiment will be described.

Figure 16:
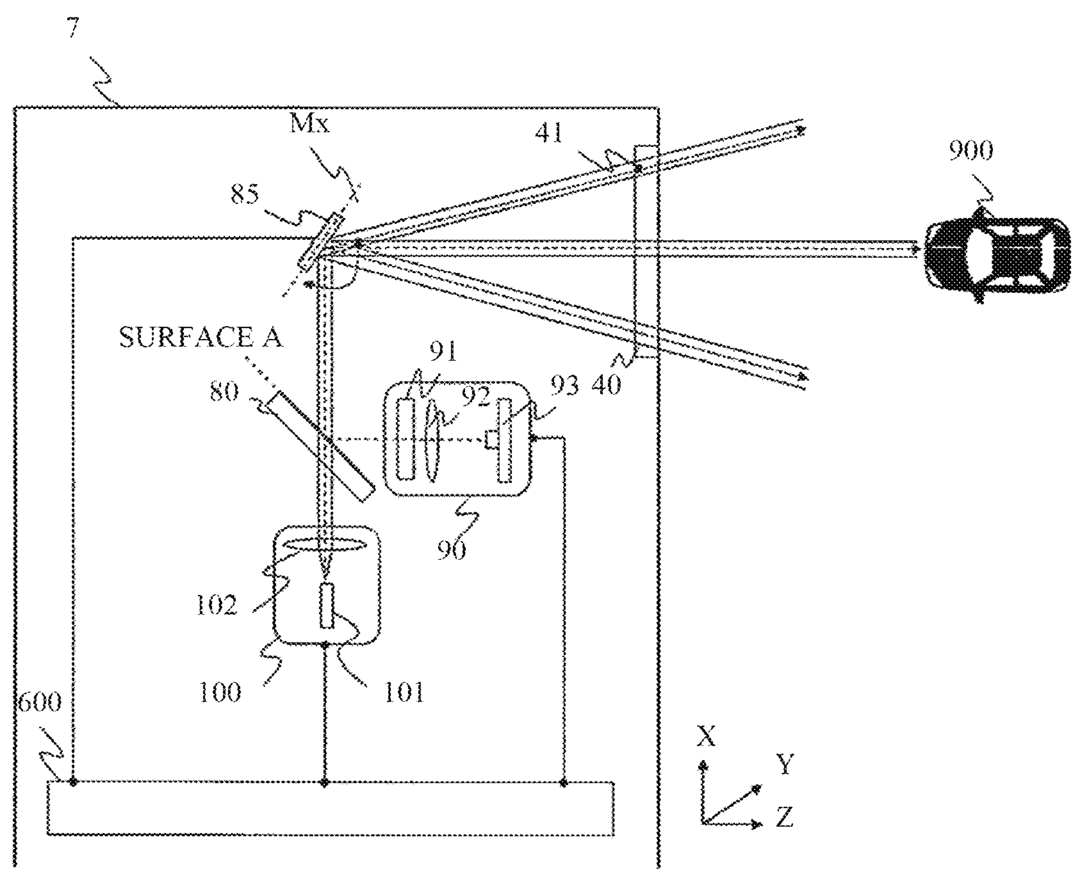
FIG. 16 is a schematic diagram of a ranging apparatus according to a fifth embodiment.

FIG. 16 is a schematic diagram of a ranging apparatus (optical apparatus). Reference numeral 100 denotes a light source unit 100, and diverging light from a light source 101 is collimated by a collimator lens 102. Reference numeral 80 denotes a separator that separates an illumination optical path to illuminate an object using the light from the light source unit 100 and a light receiving optical path to receive reflected light from the object.

Figure 17:
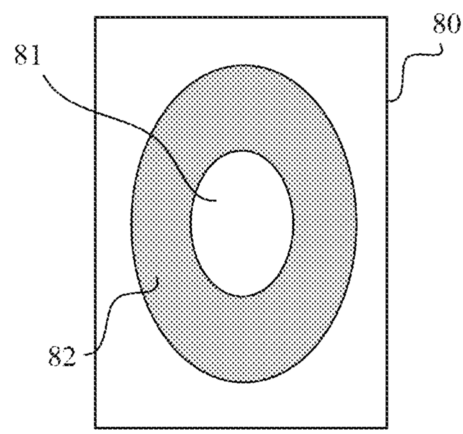
FIG. 17 is a diagram showing a relationship of areas of a separator.

The separator 80 is, for example, a perforated mirror, a mirror having an area that transmits a specific area from the center of the optical axis and reflects the other area, and a polarization beam splitter. The separator 80 is, for example, configured as a plane plate as illustrated in FIG. 17, and has an area 81 that transmits most of the light flux of the light source unit 100 while partially reflecting the light flux and an area 82 that reflects light from the side of the driving mirror on a surface A on the emission side.

The area 81 when viewed from the side of the light source unit 100 is smaller than an effective diameter of a scanning mirror 85 when viewed from the side of the light source unit 100, and the light flux passing through the area 81 is configured to be within the effective diameter of the scanning mirror.

Reference numeral 85 denotes a two-dimensional scanning driving mirror that is driven to rotate about the Y-axis with respect to the mirror center and about the direction of the dashed-dotted line Mx perpendicular to the Y-axis, and deflects a light flux from the light source unit. In the driving mirror, compared to scanning on the Mx, scanning on the Y direction is faster and has wider scanning angle. The driving mirror 85 also illuminates the object while two-dimensionally deflecting the illumination light from the light source unit 100, and also deflects the reflected light from the object to the side of the separator 80.

Reference numeral 90 denotes a detector, which includes a bandpass filter 91, an imaging lens 92, and a light receiving element 93. The light reflected and scattered from the object is received by the light receiving element 93 of the detector 90 through the driving mirror and the separator.

A controller 600 controls scanning parameters of the light source unit 100, scanning of the scanning mirror 85, and light receiving parameters of the detector 90.

Reference numeral 40 is a window that transmits light from inside the apparatus, and reference numeral 41 is a reference light generation area for reflecting and scattering the illumination at a specific angle of view α while dimming the illumination.

Additionally, the window 40 is simply described as being parallel to the XY plane in this embodiment, but is desirably sidlingly arranged so that part of the illumination light reflected from the scanning mirror 85 does not return to the scanning mirror 85 by being reflected by the window 40.

Figure 18A:
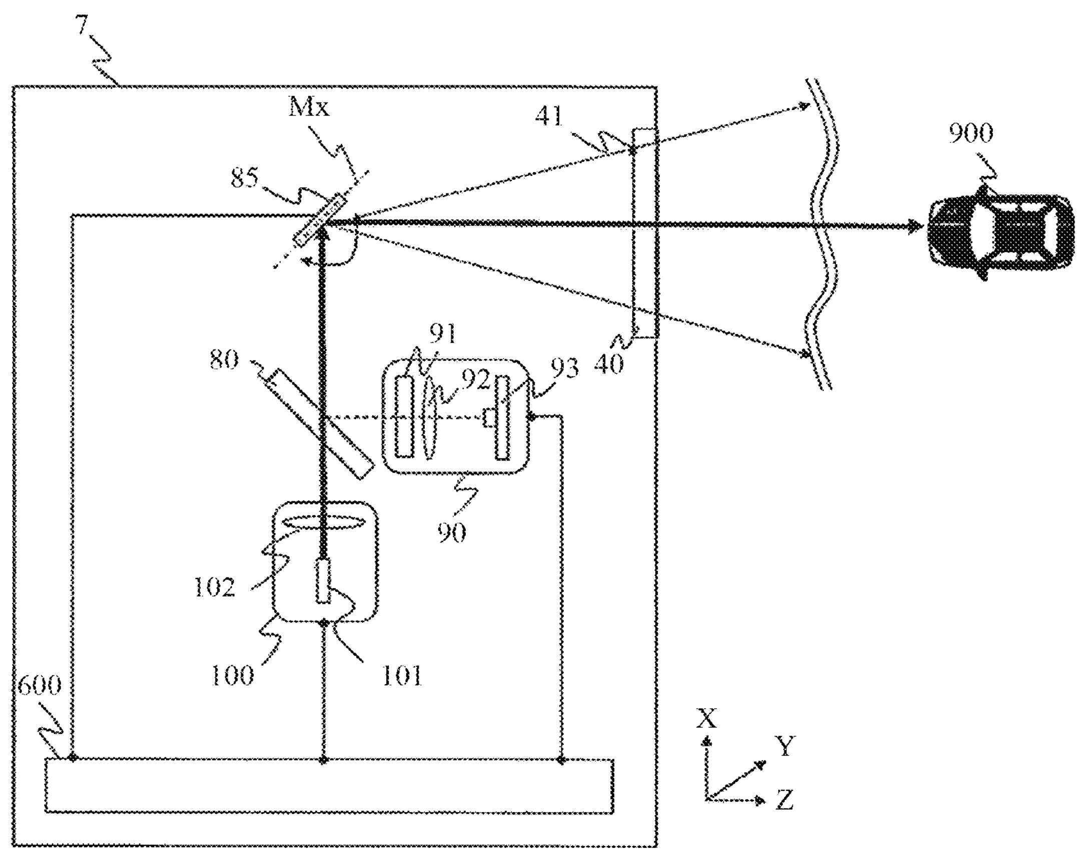
FIGS. 18A and 18B are diagrams explanatory diagrams of an illumination optical path and a light receiving optical path of the ranging apparatus.
Figure 18B:
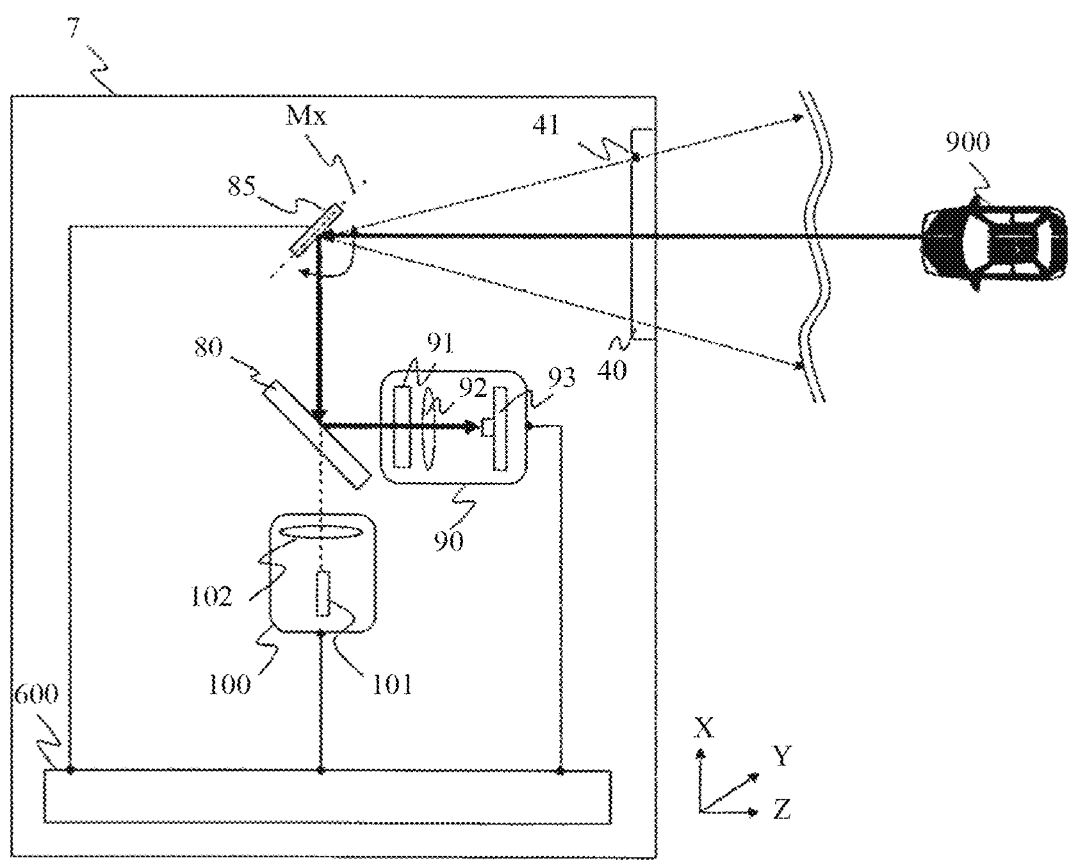

As illustrated in FIGS. 18A and 18B, the above configuration separates the illumination optical path from the light receiving optical path. In FIG. 18A, the light flux from the light source unit 100 transmits through the area 81 of the separator 80, is reflected while being scanned by the driving mirror 85, and illuminates the object 900. In FIG. 18B, the light flux from the light source unit 100 is separated by the area 82 of the separator 80, is reflected, and is collected by the detector 90.

Figure 19:
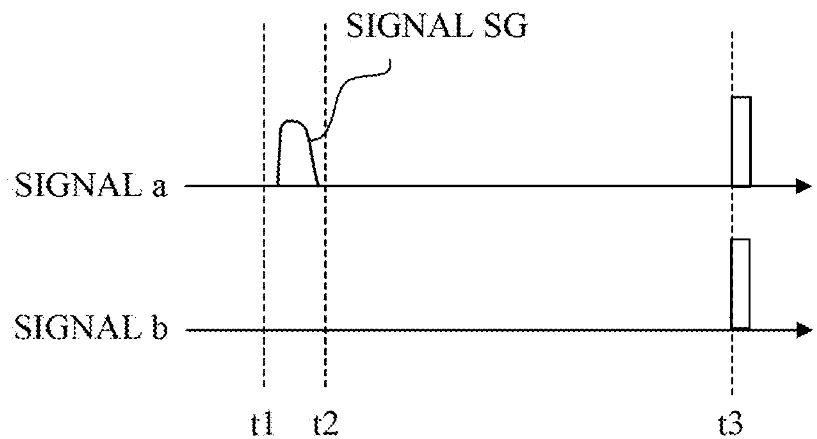
FIG. 19 is a diagram showing a signal of reference light and a signal from an object.

In FIG. 19, the signals a and b are respectively received signals when the object 900 is located at a field angle α and at a field angle β other than the field angle α. t1 is a time during which light is emitted from the light source, and a reference t3 is a time during which the reflected light from the object 900 is received. At the filed angle α, the signal SG based on the reference light is detected during a very short period from the time t1 to t2.

Figure 20:
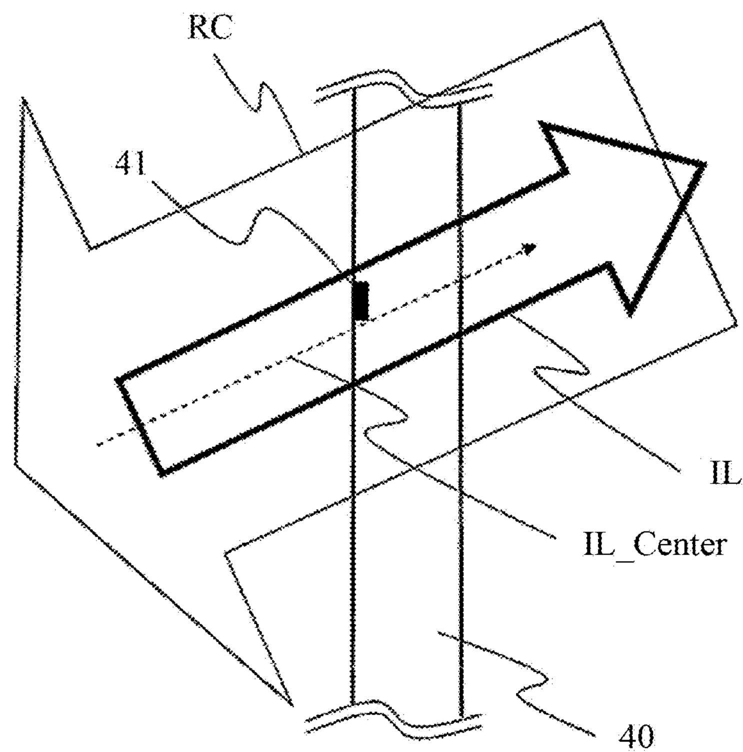
FIG. 20 is a diagram showing a relationship between illumination light flux and a reference light generating area.

FIG. 20 illustrates a relationship between the reference light generation area 41 and the illumination light flux. In FIG. 20, IL is the illumination light flux, IL_Center is the optical axis when illumination or light reception, and RC is the receiving light flux RC. The reference light generation area 41 is formed the apparatus interior side of the window, and is smaller than the effective diameter of the illumination light flux IL. The effective diameter of the illumination light flux IL is, for example, the diameter having intensity of $1/e^2$ or 1% to a region with the highest intensity of illumination when viewed the optical axis IL_Center in a vertical section. Reducing the reference light generation region 41 can decrease the reflected light by the area ratio of the reference light generation region to the illumination light flux, separately from the reflectance of the reference light generation region.

In addition, the reference light generation area 41 is the reflection part formed on the window 40, but may be the antireflection film, which is different from other parts and has the reflectance higher than that of the antireflection film on the window 40.

Furthermore, the reference light generation area 41 may an edge surface such as a flaw formed in a linear shape or a dotted shape relative to the window 40. In that case, since diffusing, the reflect light towards the light receiving element by being polarized by the driving mirror decreases with the whole reflected light.

Besides, since part of the light transmitted obliquely to the optical axis of the imaging lens 92 of the detector 90 does not reach the light receiving element 93, the quantity of the light finally detected by the light receiving element 93 can be further reduced. However, the reference light generation area 41 in the cross section of the driving mirror in the scanning direction is preferably smaller than the diameter of the Illumination light flux.

When the width of the illumination light flux IL is ILH and the width of the reference light generation area is t in the cross section of the driving mirror in the scanning direction, for example, the reference reflective area can be set so that the range of $0.01<t/ILH<0.9$ or $0.1<t/ILH<0.5$ is satisfied.

Also, in the reference light generation area 41, the width in the scanning direction is desirably equal to or smaller than the width in the direction perpendicular to the scanning direction. Arranging the reference light generation region smaller than the illumination light flux can forms the reference reflected light having the appropriate light quantity even if the illumination light quantity increases in the remote ranging.

Using the reference reflected light can accurately measure the direction of the deflector and the emitted light. Additionally, since the deflection angle can be corrected by controlling the deflector on the basis of the measurement result, more accurate ranging can be performed.

Sixth Embodiment

Figure 21:
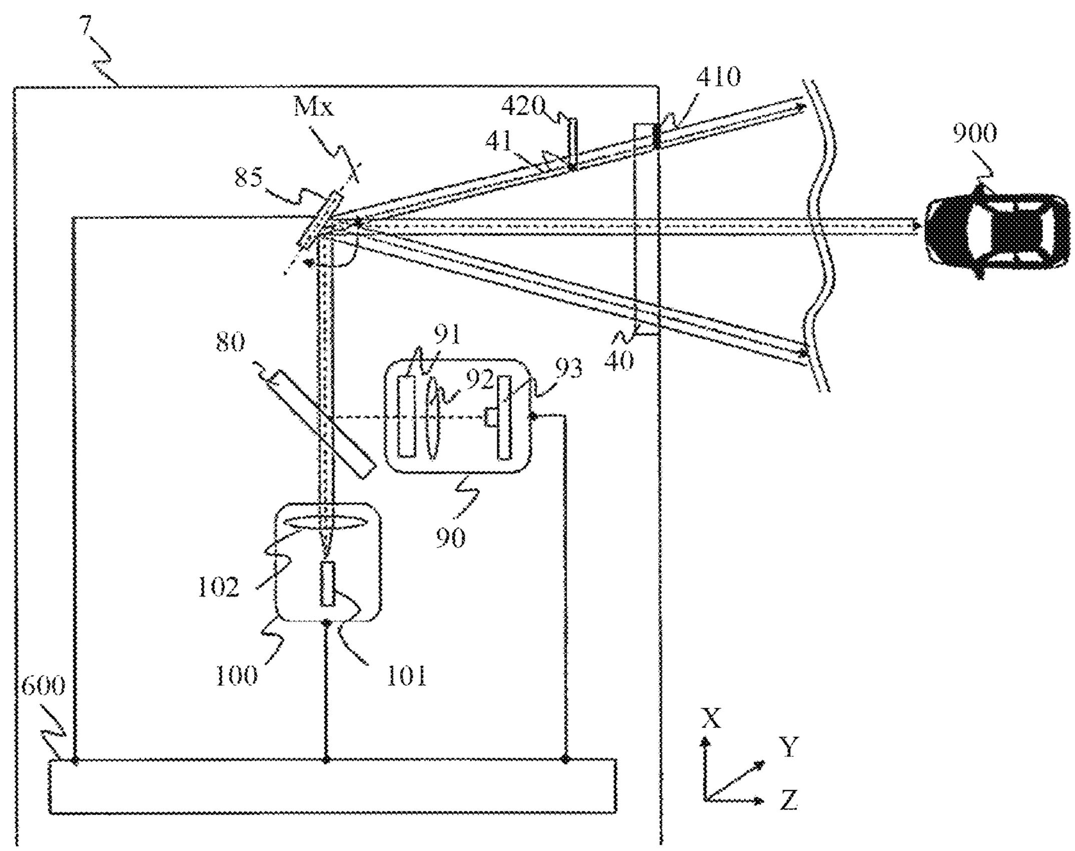
FIG. 21 is a schematic diagram of a ranging apparatus according to a sixth embodiment.

FIG. 21 illustrates a ranging apparatus (optical apparatus) 8 according to a sixth embodiment. In this embodiment, compared to the fifth embodiment, the reference light generation region 41 is arranged on a side surface of a reference light generator 420 separate from a window 420 and the window has a shielding member 410.

Figure 22:
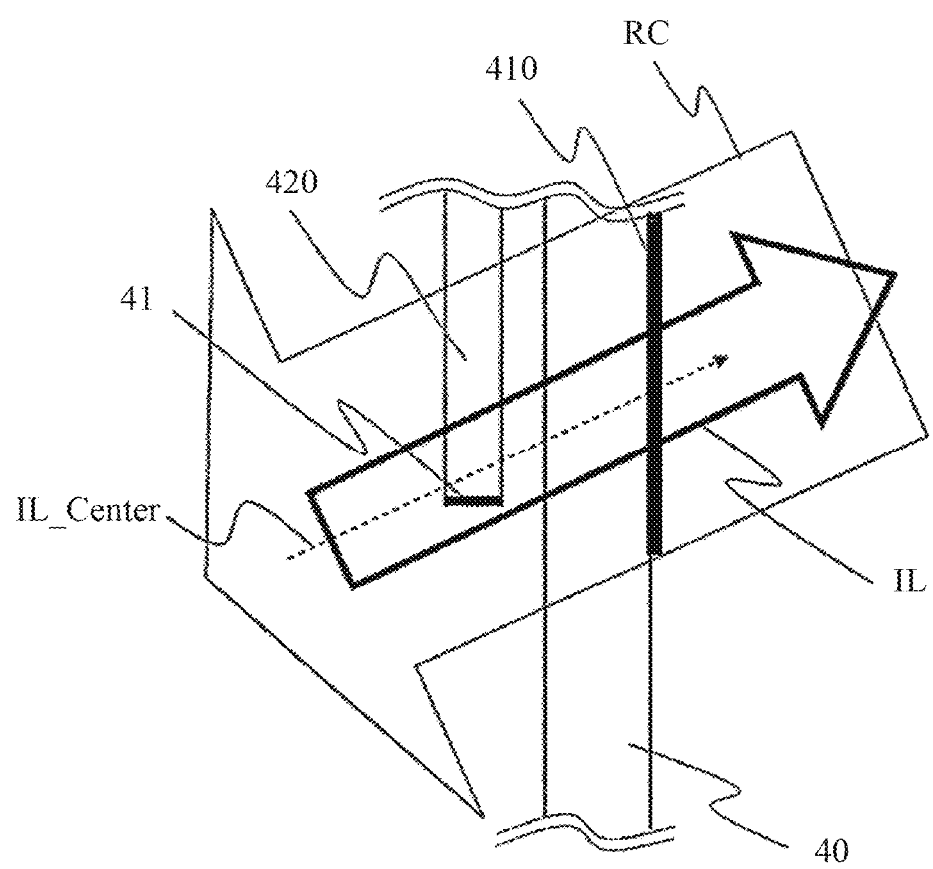
FIG. 22 is a diagram showing a relationship among illumination light flux, a reference light generating area, and a shielding member.

FIG. 22 illustrates an enlarged view near the reference light generation area 41 at the field angle α. Similarly to the fifth embodiment, IL is the illumination light flux, IL_Center is the optical axis during illumination or light reception, and RC is the receiving light flux RC. The illumination light flux IL is reflected by the reference light generation region 41 and is detected as the reference light by the light receiving element 93. The reference light generation area 41 is arranged to be smaller than the effective diameter of the illumination light flux IL when viewed in the cross section perpendicular to the optical axis IL_Center, and the illumination light flux IL transmits the other part of the reference light generation area 41.

Also, the reference light generator 420 is an ND filter that absorbs light having the wavelength of the light source 101, and most of the illumination light is absorbed by the ND filter.

Furthermore, the shielding part 410 absorbs or greatly scatters the light having the wavelength of the light source 101.

The illumination light flux IL is classified into three types when passing the vicinity of the reference light generation area 41. The first is mostly absorbed by the reference light generator 420, and the transmitted light is absorbed or scattered by the shielding member 410. The second is mostly is transmitted and refracted or is forward scattered by the reference light generation area 41, but part is scattered backward and detected by the light receiving element 93 as reference light. The third does not hit the absorption part of, the reference light generator 420 or the reference light generation area 41, and is absorbed or scattered by the shielding member 410. And, the shielding part 410 is arranged to block the received light flux RC at the field angle α. In this configuration, since the received light flux RC is shielded while the constant reference light is formed by the illumination light IL, the size of the reference light does not change due to external light, so that the direction of the object can be more stably detected.

By the way, in this present embodiment, the shielding member 410 is arranged outside the apparatus, but may be arranged inside the apparatus.

Also, if the reference light generation area 41 is arranged to be smaller than the illumination light flux IL when viewed on a cross section perpendicular to the optical axis, the direction of the reference light generation area 41 may be different from the direction in FIG. 22. At a specific angle of view, arranging the reference light generation area and the shielding member while arranging a reflective surface smaller than the cross-sectional area of the illumination light flux, separating other light by absorption or scattering, and shielding so that external light does not enter is purport of the present invention. As a result, even if the quantity of the illumination light increases for the remote ranging, a reference reflected light having an appropriate light quantity can be formed without being affected by external light, and the direction of the object and distance to the object in the remote ranging can be accurately measured.

According to the above embodiment, in the coaxial LIDAR optical system in which the direction of illumination and the direction of light reception are in the same direction, even if the quantity of illumination light increases for the remote ranging, the direction of the object and the distance to the object located at long range can be detected by appropriately generating the reference light to detect the direction of the object.

Also, even if the swing angle of the driving mirror or the output of the light source changes or the timing of various signals in signal processing changes due to the influence of the change in the outside air temperature, the direction of the object and distance to the object located at a long range can be accurately measured.

[On-Board System]

Figure 23:
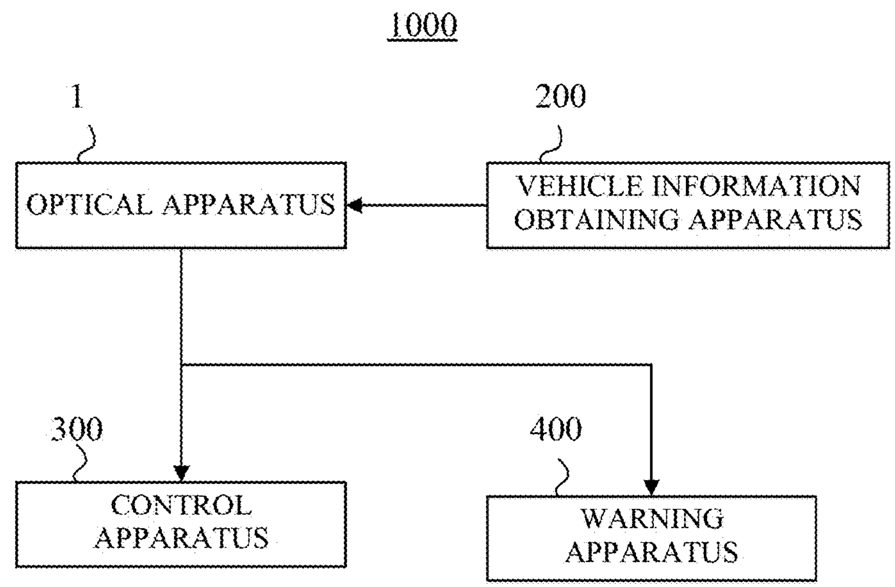
FIG. 23 is a configuration diagram of an on-board system according to the present embodiment.
Figure 24:
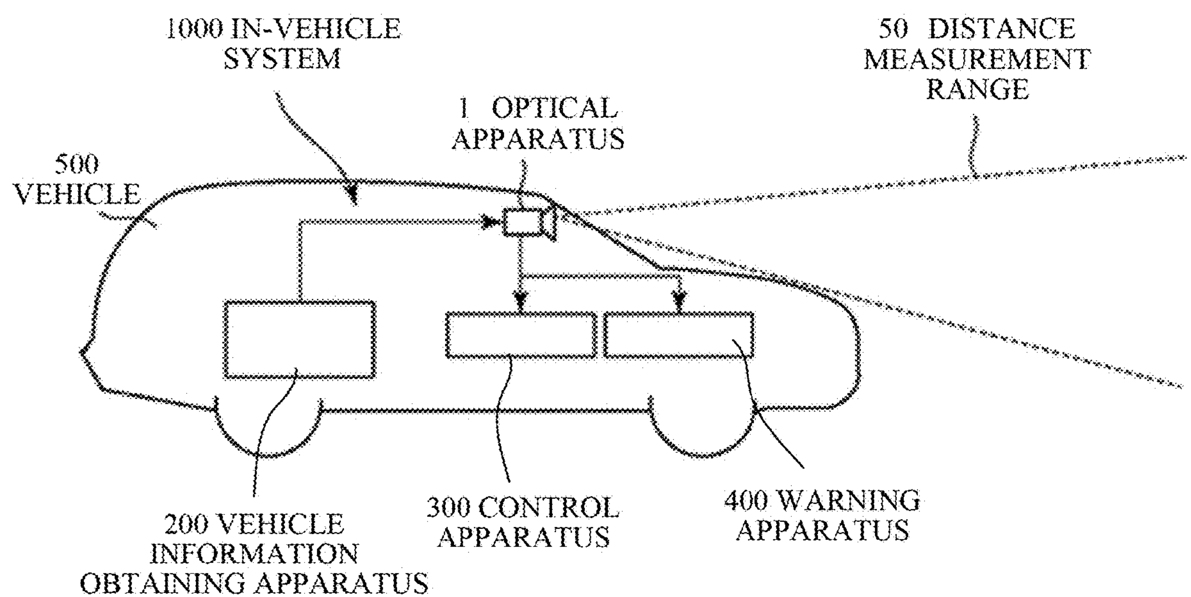
FIG. 24 is a schematic diagram of a vehicle (movement apparatus) according to the present embodiment.

FIG. 23 is a configuration diagram of an optical apparatus 1 according to this embodiment and on-board system (driving assistance apparatus) 1000 including the same. The on-board system 1000 is held by a movable body (movement apparatus) such as an automobile (vehicle), and is an apparatus to support vehicle driving (steering) on the basis of distance information of the object such as an obstacle or a pedestrian around the vehicle obtained by the optical apparatus 1. FIG. 24 is a schematic diagram of a vehicle 500 including the on-board system 1000. FIG. 24 shows a case in which the distance measurement range (detection range) of the optical apparatus 1 is set in front of the vehicle 500, but the distance measurement range may be set behind or beside the vehicle 500.

As illustrated in FIG. 23, the on-board system 1000 includes the optical apparatus 1, a vehicle information obtaining apparatus 200, a control apparatus (ECU: electronic control unit) 300, and a warning apparatus (warning unit) 400. In the on-board system 1000, the controller 60 included in the optical apparatus 1 has a function as a distance obtaining unit (obtaining unit) and a collision determination unit (determination unit). However, if necessary, the on-board system 1000 may be provided with a distance obtaining unit and a collision determination unit separate from the controller 60, and each may be provided outside the optical apparatus 1 (for example, inside the vehicle 500). Alternatively, the control apparatus 300 may be used as the controller 60.

Figure 25:
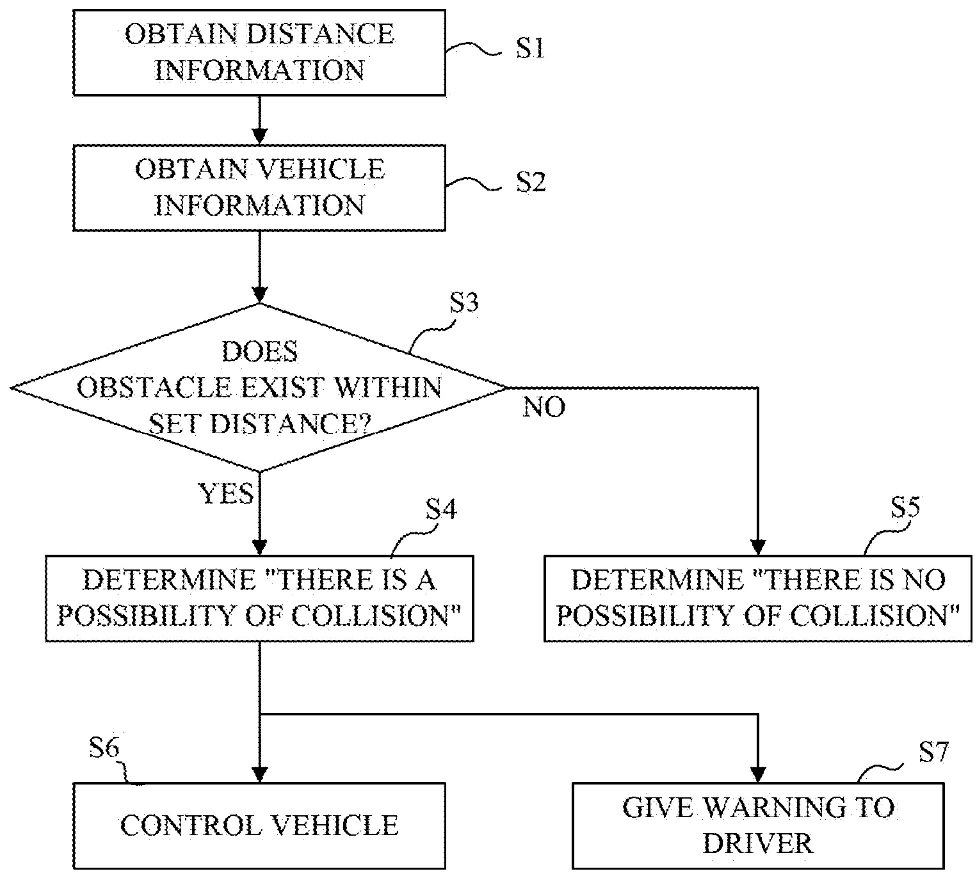
FIG. 25 is a flowchart showing an operation example of the on-board system according to the present embodiment.

FIG. 25 is a flowchart showing an operation example of the on-board system 1000 according to this embodiment. Hereinafter, the operation of the on-board system 1000 will be described with reference to this flowchart.

First, at the step S1, the controller 60 obtains distance information of the object on the signal output from the light receiving element 52 by receiving the reflected light from the object which is arranged around the vehicle and is illuminated by the light source unit 10 of the optical apparatus 1. At the step S2, the vehicle information obtaining apparatus 200 obtains the vehicle information including the speed, the yaw rate, and the steering angle of the vehicles.

At the step S3, the controller 60 determines whether or not the distance to the object is within the range of the previously set distance using the distance information obtained at the step S1 and the vehicle information obtained at the step S2.

Thus, whether or not the object exists within the set distance around the vehicle is determined, and the possibility of collision between the vehicle and the object can be determined. The processes of the steps S1 and S2 may be performed in the reverse order to the above order, or may be performed in parallel with each other. The controller 60 determines that "there is a possibility of collision" when the object exists within the set distance (step S4), and determines that "there is no possibility of collision" when the object does not exist within the set distance (step S5).

Next, when determining that there is a possibility of collision, the controller 60 notifies (transmits) the determination result to the control apparatus 300 and the warning apparatus 400. At this time, the control apparatus 300 controls the vehicle on the basis of the determination result by the controller 60 (step S6), and the warning apparatus 400 issues a warning to the user (driver) of the vehicle on the basis of the determination result at by the controller 60 (step S7). The determination result may be notified to at least one of the control apparatus 300 and the warning apparatus 400.

The control apparatus 300 can control the movement of the vehicle by outputting the control signal to the drive unit (such as an engine or a motor). For example, in the vehicle, controls, such as applying a brake, returning an accelerator, turning a steering wheel, and generating a control signal for generating a braking power on each wheel to suppress the output of the engine or a motor, are performed. The warning apparatus 400 gives a warning to the driver, for example, generating a warning sound, displaying warning information on a screen of a car navigation system, or giving vibration to a seat belt or a steering wheel.

The on-board system 1000 according to the present embodiment can detect and measure the distance of the object using the above processing, and thus can avoid collision between the vehicle and the object. In particular, by applying the optical apparatus 1 according to each of the embodiments to the on-board system 1000, a high ranging accuracy can be realized, so that the detection of the object and the collision determination can be performed with high accuracy.

In the present embodiment, the on-board system 1000 is applied to driving assistance (collision damage reduction), but the present invention is not limited to this. The on-board system 1000 may be used for cruise control (including a function to follow all vehicle speeds) and automatic driving. In addition, the on-board system 1000 can be applied not only to a vehicle such as an automobile but also the movable body such as a ship an aircraft, or an industrial robot. Further, the on-board system 1000 can be applied not only to the movable body but also various devices using object recognition, such as an intelligent transportation system (ITS) and a monitoring system.

Additionally, the on-board system 1000 and the movement apparatus 500 may include a notification apparatus (notification unit) to notify collision between the movement apparatus 500 and the obstacle to the manufacturer (maker) of the on-board system or the selling source (dealer). For example, as the notification apparatus, an apparatus that transmits information (collision information) regarding collision between the movement apparatus 500 and the obstacle to the external notification destination set in advance by e-mail can be adopted.

In this way, by adopting a configuration in which the collision information is automatically notified by the notification apparatus, it is possible to promptly perform a check or a repair after the collision occurs. The destination of the collision information may be an insurance company, a medical institution, the police, or any other agency set by the user. Further, the notification apparatus may be configured to notify the notification destination of not only the collision information but also the failure information of each unit and the consumption information of the consumables. The detection of the presence or absence of the collision may be performed using the distance information obtained on the basis of the output from the light receiving unit 2 described above, or may be performed by other detecting unit (sensor).

According to the present embodiment, it is possible to provide the optical apparatus, the on-board system, and the movement apparatus that can easily obtain information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-079293, filed on Apr. 18, 2019 and 2020-052363, filed on Mar. 24, 2020, which are hereby incorporated by reference herein in their entirety.

What is claimed is:

1. An optical apparatus comprising:

a deflector configured to deflect illumination light from a light source to scan an object, and configured to deflect light reflected from the object, a light guide configured to guide the illumination light from the light source to the deflector, and configured to guide light reflected from the deflector to a light receiving element, an optical member having a reflective area that reflects first light which is part of the illumination light from the deflector so that the first light re-enters the deflector; and a controller configured to obtain information regarding the deflector on the basis of information of the first light from the reflective area, wherein, in a cross-section including the optical path from the reflective area to the light guide, a width of the reflective area is smaller than a width of the illumination light on the reflective area.

2. The optical apparatus according to claim 1, wherein the optical member includes a transmissive area that transmits the illumination light.

3. The optical apparatus according to claim 1, wherein the optical member includes an absorptive area that absorbs the illumination light.

4. The optical apparatus according to claim 1, wherein the optical member is a window facing an outside of the optical apparatus.

5. The optical apparatus according to claim 1, further comprising a window facing an outside of the optical apparatus, wherein the window includes a light shielding area that shields light from the optical member.

6. The optical apparatus according to claim 1, wherein the controller is configured to control a deflection angle of the illumination light being deflected by the deflector.

7. The optical apparatus according to claim 1, wherein the controller is configured to control a deflection frequency of the deflector.

8. The optical apparatus according to claim 1, wherein the controller is configured to control light emission of the light source on the basis of the information of the first light.

9. The optical apparatus according to claim 1, wherein the light receiving element is configured to receive the first light, reflected by the reflective area, before receiving the light reflected from the object.

10. The optical apparatus according to claim 1, wherein the optical member does not have refractive power.

11. The optical apparatus according to claim 1, further comprising an optical system configured to enlarge a diameter of the illumination light from the deflector, and configured to reduce a diameter of the light reflected from the object, wherein the optical member is included in the optical system.

12. The optical apparatus according to claim 11, wherein the deflector is arranged so that an optical path of principal ray of the illumination light at a central field angle in a scanning area of the deflector does not coincide with an optical axis of the optical system.

13. The optical apparatus according to claim 1, wherein the first light is reflected by a reference part provide in the optical member.

14. The optical apparatus according to claim 1, wherein the optical member includes an area where the illumination light transmits, and wherein the area includes a first area having a first transmissivity, and a second area having a second transmissivity different from the first transmissivity.

15. The optical apparatus according to claim 1, further comprising a light shielding member configured to shield the first light.

16. The optical apparatus according to claim 1, wherein the controller is configured to obtain distance information of the object on the basis of an output of the light receiving element.

17. An on-board system used for a movement apparatus comprising an optical apparatus including:

a deflector configured to deflect illumination light from a light source to scan an object, and configured to deflect light reflected from the object, a light guide configured to guide the illumination light from the light source to the deflector, and configured to guide light reflected from the deflector to a light receiving element, an optical member having a reflective area that reflects first light which is part of the illumination light from the deflector so that the first light re-enters the deflector; and a controller configured to obtain information regarding the deflector on the basis of information of the first light from the reflective area, wherein, in a cross-section including the optical path from the reflective area to the light guide, a width of the reflective area is smaller than a width of the illumination light on the reflective area, and wherein the on-board system is configured to determine a possibility of collision between the movement apparatus and the object on the basis of distance information of the object obtained by the optical apparatus.

18. The on-board system according to claim 17, further comprising a control apparatus configured to output a control signal to generate a braking power for the movement apparatus when it is determined that there is the possibility of collision between the movement apparatus and the object.

19. The on-board system according to claim 17, further comprising a control warning apparatus configured to give a warning to a driver of the movement apparatus when it is determined that there is the possibility of collision between the movement apparatus and the object.

20. A movement apparatus comprising an optical apparatus including:

a deflector configured to deflect illumination light from a light source to scan an object, and configured to deflect light reflected from the object, a light guide configured to guide the illumination light from the light source to the deflector, and configured to guide light reflected from the deflector to a light receiving element, an optical member having a reflective area that reflects first light which is part of the illumination light from the deflector so that the first light re-enters the deflector; and a controller configured to obtain information regarding the deflector on the basis of information of the first light from the reflective area, wherein, in a cross-section including the optical path from the reflective area to the light guide, a width of the reflective area is smaller than a width of the illumination light on the reflective area, and wherein the movement apparatus moves while holding the optical apparatus.

* * * * *